(12) United States Patent
Yokoi

(10) Patent No.: US 8,299,142 B2
(45) Date of Patent: Oct. 30, 2012

(54) INK COMPOSITION, INKJET RECORDING METHOD, AND PRINTED ARTICLE

(75) Inventor: Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 780 days.

(21) Appl. No.: 12/320,717

(22) Filed: Feb. 3, 2009

(65) Prior Publication Data

US 2009/0197055 A1 Aug. 6, 2009

(30) Foreign Application Priority Data

Feb. 5, 2008 (JP) ................................. 2008-025128
Jan. 28, 2009 (JP) ................................. 2009-016635

(51) Int. Cl.

| | |
|---|---|
| B32B 9/04 | (2006.01) |
| B32B 27/00 | (2006.01) |
| B41J 2/01 | (2006.01) |
| B41J 2/17 | (2006.01) |
| C07D 303/40 | (2006.01) |
| C08F 2/46 | (2006.01) |
| C08F 283/12 | (2006.01) |
| C08G 65/18 | (2006.01) |
| C09D 5/00 | (2006.01) |
| C09D 11/00 | (2006.01) |
| G01D 11/00 | (2006.01) |

(52) U.S. Cl. .......... 523/160; 522/99; 522/148; 522/168; 522/170; 523/161; 347/1; 347/95; 347/96; 347/100; 347/102; 428/411.1; 428/447; 428/500

(58) Field of Classification Search .................... 522/99, 522/148, 168, 170; 523/160, 161; 347/1, 347/95, 96, 100, 102; 428/411.1, 447, 500
See application file for complete search history.

(56) References Cited

U.S. PATENT DOCUMENTS

| | | |
|---|---|---|
| 5,091,440 A | 2/1992 | Griswold |
| 5,863,966 A | 1/1999 | Ebbrecht et al. |
| 6,291,540 B1 | 9/2001 | Priou et al. |
| 2003/0225199 A1 | 12/2003 | Breunig et al. |
| 2007/0035604 A1 | 2/2007 | Jang |

FOREIGN PATENT DOCUMENTS

| | | |
|---|---|---|
| EP | 0761784 A | 3/1997 |
| EP | 0940458 A | 9/1999 |
| EP | 1637926 A | 3/2006 |
| JP | A 63-235382 | 9/1988 |
| JP | A 3-216379 | 9/1991 |
| JP | A 5-214280 | 8/1993 |
| JP | A 5-222198 | 8/1993 |
| JP | B 6-21256 | 3/1994 |
| JP | B 6-62905 | 8/1994 |
| JP | A 2001-525479 | 12/2001 |
| JP | 2004-149699 * | 5/2004 |
| WO | 01/27181 A | 4/2001 |
| WO | 2004/031308 A | 4/2004 |

OTHER PUBLICATIONS

Machine English translation of JP 2004-149699, Ishizeki et al., May 2004.*
English Abstract of JP 2004-149699, Ishizeki et al., May 2004.*
The extended European search report dated May 18, 2009.

* cited by examiner

*Primary Examiner* — Patrick Niland
(74) *Attorney, Agent, or Firm* — SOLARIS Intellectual Property Group, PLLC

(57) ABSTRACT

The present invention provides an ink composition having excellent ink ejection stability and stretching property, curable with a high sensitivity by irradiation of radiation rays, and capable of forming an image excellent in rubfastness and blocking resistance, an inkjet recording method using the ink composition, and a printed article. The ink composition includes (a) a polymer having a siloxane structure and a polymerizable group on a side chain thereof, (b) a polymerizable compound, and (c) a photopolymerization initiator, and the inkjet recording method includes a step of ejecting the ink composition onto a recording medium to be recorded with an inkjet recording apparatus and a step of curing the ink composition by irradiating active radiation rays on the ejected ink composition.

10 Claims, No Drawings

INK COMPOSITION, INKJET RECORDING METHOD, AND PRINTED ARTICLE

CROSS-REFERENCE TO RELATED APPLICATION

This application claims priority under 35 USC 119 from Japanese Patent Application Nos. 2008-025128 and 2009-16635, the disclosures of which are incorporated by reference herein.

BACKGROUND OF THE INVENTION

1. Field of the Invention

The present invention relates to an ink composition, an inkjet recording method, and a printed article produced therewith.

2. Description of the Related Art

There are many image-recording methods for forming an image on a recording medium such as paper based on image data signals, including those by an electrophotographic process, sublimation or fusion heat-transfer process, and inkjet process. For example, the inkjet process is advantageous in that it allows printing in a cheaper device at a lower running cost, because it forms an image directly on a recording medium by ejecting ink only in a required image region and thus uses the ink more efficiently. In addition, the inkjet process is also less noisy and thus advantageous as an image-recording method.

According to the inkjet method, it is possible to print not only on regular paper but also on a non-absorptive recording medium such as a plastic sheet or a metal plate. However, increased speed at the time of printing and increased image quality are key issues, and it is a property of the inkjet method that the time required for drying and curing droplets after printing greatly affects the productivity of printed materials and the sharpness of printed images.

As one of the inkjet methods, there is a recording method using an inkjet recording ink that is curable by irradiation of radiation. According to this method, by curing ink droplets by irradiating radiation immediately after or after a fixed time after the ink is ejected, the productivity of printing can be increased, and sharp images can be formed.

By increasing the sensitivity of the inkjet recording ink which is curable by irradiation with a radiation ray such as ultraviolet light, the ink has higher curability with respect to radiation rays, which brings about many benefits such as improvement in inkjet recording efficiency, reduction in power consumption, prolongation of the lifetime of a radiation ray generator owing to a decrease in the load, and prevention of volatilization of low molecular weight substances caused by insufficient curing. Further, the increase in the sensitivity particularly increases the strength of the image formed using the inkjet recording ink.

Such an inkjet method for curing by radiation such as ultraviolet rays has been drawing attention from the standpoints of relatively less odor, quick drying properties, and a capability of recording onto a non-ink-absorptive recording medium. Ultraviolet ray curable ink compositions for inkjet using radical polymerization are disclosed in Japanese Patent Application Laid-Open (JP-A) No. 63-235382, JP-A No. 3-216379, JP-A No. 5-214280, Japanese Patent Application Publication (JP-B) No. 6-21256, and JP-B No. 6-62905.

In addition, in order to attain inkjet ejection stability, for the purpose of reducing the surface tension of an inkjet ink, inkjet inks using silicone derivatives (for example, see Japanese National Phase Publication No. 2001-525479 and JP-A No. 5-222198), an inkjet recording method, and a printed article using the inkjet inks are disclosed.

However, these inks (compositions) are insufficient in rubfastness and blocking resistance of images formed by ejecting the inks, and have been unable to attain sufficient compatibility between the ink ejection stability and the curing properties of resultant images.

SUMMARY OF THE INVENTION

In view of the above circumstances, it is an object of the present invention to provide an ink composition excellent in ink ejection stability and stretching property, curable at high sensitivity by irradiation of radiation rays, also having a capability of forming images excellent in rubfastness and blocking resistance, an inkjet recording method using the ink composition, and a printed article. More specifically, the invention according to an aspect of the invention provides an ink composition comprising: (a) a polymer having a siloxane structure and a polymerizable group on a side chain thereof, (b) a polymerizable compound, and (c) a photopolymerization initiator; an inkjet recording method using the ink composition; and a printed article recorded by the inkjet recording method.

DETAILED DESCRIPTION

The inventors found, after studying hard the problems, that the objects to solve the problems may be achieved by items <1> to <11> shown below.

<1> An ink composition comprising: (a) a polymer having a siloxane structure and a polymerizable group on a side chain thereof; (b) a polymerizable compound; and (c) a photopolymerization initiator.

<2> The ink composition according to the item <1>, wherein a siloxane compound capable of forming the siloxane structure of the polymer (a) having a siloxane structure and a polymerizable group on a side chain thereof is a compound represented by the following Formula (A):

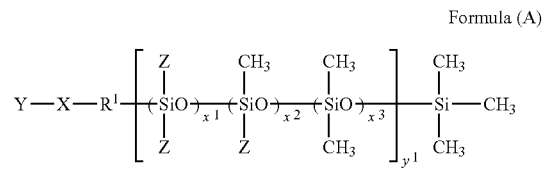

Formula (A)

wherein in Formula (A), $R^1$ is a straight chain or branched alkylene group having 2 to 6 carbon atoms or a divalent connecting group represented by the following Formula (B); $x^1$, $x^2$ and $x^3$ are integers having a relationship such that the sum of $x^1$, $x^2$ and $x^3$, $(x^1+x^2+x^3)$, is from 1 to 100; $y^1$ is an integer of from 1 to 10; X is a single bond or a divalent group represented by the following Formula (C); Y represents a monovalent group represented by any of Formulae (D) to (F); and Z represents a monovalent group represented by the following Formula (G);

Formula (B)

wherein in Formula (B), $R^2$ represents a hydrogen atom or a methyl group, and n represents an integer of from 1 to 50;

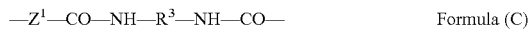
Formula (C)

wherein in Formula (C), $Z^1$ represents an oxygen atom, a sulfur atom, or $NR^4$; $R^4$ represents a hydrogen atom or an alkyl group having 1 to 4 carbon atoms; $Z^1$ is bonded to $R^1$ in Formula (A); and $R^3$ represents a divalent aliphatic or alicyclic group having 6 to 10 carbon atoms;

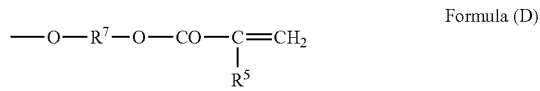
Formula (D)

Formula (E)

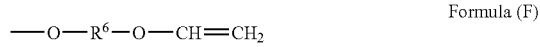
Formula (F)

wherein in Formulae (D) to (F), $R^5$ represents a hydrogen atom or a straight chain or branched alkyl group having 1 to 6 carbon atoms, $R^6$ represents a straight chain or branched chain alkylene group having 2 to 10 carbon atoms, and $R^7$ represents a straight chain or branched alkylene group having 1 to 6 carbon atoms;

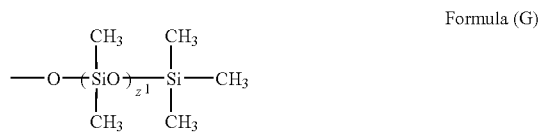
Formula (G)

wherein in Formula (G), $z^1$ is an integer of from 3 to 100.

<3> The ink composition according to the item <1> or <2>, wherein the polymerizable group of the polymer (a) having a siloxane structure and a polymerizable group on a side chain thereof is a radical polymerizable group.

<4> The ink composition according to item <1> or <2>, wherein the polymerizable group of the polymer (a) having a siloxane structure and a polymerizable group on a side chain thereof is a cationic polymerizable group.

<5> The ink composition according to any one of items <1> to <4>, wherein the polymer (a) having a siloxane structure and a polymerizable group on a side chain thereof further comprises a monomer capable of forming a homopolymer having a glass transition temperature of 50° C. or higher as a copolymerized component.

<6> The ink composition according to any one of items <1> to <3> and item <5>, wherein the polymerizable compound (b) is a radical polymerizable compound.

<7> The ink composition according to any one of items <1>, <2>, <4> and <5>, wherein the polymerizable compound (b) is a cationic polymerizable compound.

<8> The ink composition according to any one of items <1> to <7>, wherein the content of the polymer (a) having a siloxane structure and a polymerizable group on a side chain thereof is, with respect to the total solid content of the ink composition, from 0.1% to 10% by mass.

<9> An inkjet recording composition comprising the ink composition according to any one of items <1> to <8>.

<10> An inkjet recording method comprising: ejecting on a recording medium the ink composition of any one of items <1> to <9> using an inkjet recording apparatus; and curing the ink composition by irradiation of an actinic radiation ray to the ejected ink composition.

<11> A printed article recorded by the inkjet recording method according to item <10>.

In the present invention, it is considered that ink ejection property is improved by allowing a number of siloxane structures and polymerizable groups to be incorporated in the molecule by involving a polymer having a siloxane structure and a polymerizable group on a side chain thereof, and in particular, by an action of the siloxane structures, making the surface tension of the ink drops adjustable within a proper range. Further, a polymer having plural polymerizable groups is deposited and segregated efficiently on the surface of the ejected ink where the ink is most difficult to be cured due to oxygen interference, and crosslinking reaction proceeds efficiently, so that a solid film is formed by rapid curing. Whereby, the surface of the resultant ink image acquires excellent rubfastness and blocking resistance, in addition, the crosslinking density inside the ink becomes lower as compared with the crosslinking density obtained by addition of usual multi-functional monomers. In this way, compatibility among flexibility, curing property, and rubfastness is considered to be attained.

<Ink Composition>

The ink composition of the present invention includes (a) a polymer having a siloxane structure and a polymerizable group on a side chain thereof (hereinafter, called as "specific polymer (a)" in some cases arbitrarily), a polymerizable compound (b), and a photopolymerization initiator (c).

Hereinafter, each constituent component used for the ink composition of the present invention will be described one by one.

—(a) Polymer Having Siloxane Structure and Polymerizable Group on a Side Chain Thereof—

The specific polymer (a) has a principal chain skeleton of a usual ethylenically polymer unit such as acrylic acid, having a siloxane structure and a polymerizable group on a side chain thereof. That is, the principle chain skeleton of the specific polymer (a) includes no siloxane structure.

The specific polymer (a) is preferably a polymer comprising a structural unit having a siloxane structure on a side chain thereof and another structural unit having a polymerizable group on a side chain thereof. A method of obtaining the specific polymer (a) according to the present invention may include, for example, when the polymerizable group is a radical polymerizable group, a method in which a monomer having, on a side chain thereof, a double bond precursor that has a radical polymerizable group whose reactivity is sealed with a protective group and another monomer having on a side chain thereof a siloxane structure are copolymerized; then the protective group is eliminated from the double bond precursor so as to render it into a double bond, and a method, as described in JP-A No. 2004-149699, in which a low molecular weight compound having a radical polymerizable group is incorporated, through a polymer reaction, into a polymer including a structural unit having a siloxane structure on the side chain thereof.

(Siloxane Structure)

The "siloxane structure" included in the specific polymer (a) may be included on the side chain of the specific polymer in the form of a structure having a siloxane bond. The number of the siloxane bond and the atom or functional group that is bonded to the Si atom of the siloxane bond are not particularly limited. The siloxane structure on the side chain of the specific polymer (a) increases the number of end groups having a siloxane structure that may be incorporated in the molecule, thereby increasing the solubility to a polymerizable compound (b) described later. When the ink composition of the present invention that includes the specific polymer (a) is a liquid drop, the ejection property thereof is improved, and therefore, when the ink composition is formed into a coating film, a polymer having a high segregation property may be obtained.

Note that, the segregation property (surface segregation property) means that a polymer is present in a high concentration unevenly at the interface between the air and the ink composition due to small surface tension of the ink composition.

The specific polymer including the siloxane structure is preferably a specific polymer having a polysiloxane structure that is obtained by polymerizing a compound represented by the following Formula (A) (hereinafter, also referred to as "specific siloxane compound"), from the viewpoint of increasing the ejection stability of the ink composition and enhancing the surface segregation property when the ink composition is formed into a coating film. In Formula (A), $R^1$ is incorporated as a group linking to the Si atom of a siloxane bond.

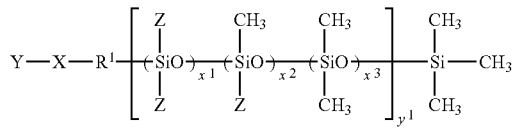

Formula (A)

In Formula (A), $R^1$ is a straight chain or branched alkylene group having 2 to 6 carbon atoms or a divalent connecting group represented by the following Formula (B).

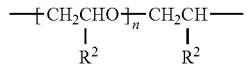

Formula (B)

In Formula (B), $R^2$ is a hydrogen atom or a methyl group; n is an integer of from 1 to 50.

In Formula (A), $x^1$, $x^2$ and $x^3$ are integers having a relationship such that the sum of $x^1$, $x^2$ and $x^3$, $(x^1+x^2+x^3)$, is from 1 to 100. $y^1$ is an integer of from 1 to 10.

In Formula (A), X is a single bond or a divalent group represented by the following Formula (C).

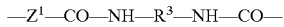

Formula (C)

In Formula (C), $Z^1$ is an oxygen atom, a sulfur atom or $NR^4$, and $R^4$ is a hydrogen atom or an alkyl group having 1 to 4 carbon atoms. In Formula (C), $Z^1$ is bonded to $R^1$ of Formula (A). In Formula (C), $R^3$ is a divalent aliphatic or alicyclic group having 6 to 10 carbon atoms.

In Formula (A), Y is a monovalent group represented by any of the following Formulae (D) to (F).

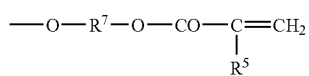

Formula (D)

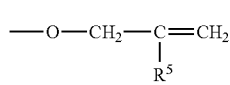

Formula (E)

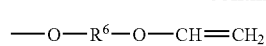

Formula (F)

In Formulae (D) to (F), $R^5$ is a hydrogen atom or a straight chain or branched alkyl group having 1 to 6 carbon atoms, $R^6$ is a straight chain or branched alkylene group having 2 to 10 carbon atoms, and $R^7$ is a straight chain or branched alkylene group having 1 to 6 carbon atoms.

In Formula (A), Z is a monovalent group represented by the following Formula (G).

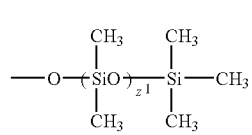

Formula (G)

In Formula (G), $z^1$ is an integer of from 3 to 100.

When the specific polymer (a) is obtained by using the specific siloxane compound, a principal chain is formed at the Y portion of Formula (A), and the side chain including a siloxane structure binds to the principal chain of the specific polymer (a) through X. Namely, the siloxane structure portion is positioned with a certain distance apart from the principal chain of the specific polymer (a). Due to this, when the specific polymer (a) derived from a specific siloxane compound is used for the ink composition of the present invention, the siloxane structure portion becomes easily oriented to the surface of the ink drop, the surface tension is easily lowered, and the surface segregation property is easily enhanced.

$R^1$ in Formula (A) is preferably a straight chain alkylene group having 1 to 6 carbon atoms, and more preferably a methylene group or a propylene group.

The sum of $x^1$, $x^2$ and $x^3$ in Formula (A) is preferably an integer of from 1 to 100 and more preferably an integer of from 1 to 10.

In Formula (A), $y^1$ is preferably an integer of from 1 to 10.

$R^2$ in Formula (B) is preferably a hydrogen atom. In Formula (B), n is preferably an integer of from 4 to 16 and more preferably an integer of from 4 to 8.

$Z^1$ in Formula (C) is preferably an oxygen atom or $NR^4$, and more preferably an oxygen atom. Further, when $Z^1$ in Formula (C) is $NR^4$, $R^4$ is preferably an alkyl group having 1 to 4 carbon atoms and more preferably a methyl group.

$R^3$ in Formula (C) is preferably a divalent group that has 6 to 10 carbon atoms and includes an aliphatic, alicyclic or aromatic structure and more preferably a group that has 6 to 8 carbon atoms and includes an aliphatic or aromatic structure.

$R^7$ in Formula (D) is preferably a straight chain or branched alkylene group having 1 to 6 carbon atoms. $R^5$ in Formula (D) is preferably a hydrogen atom, a methyl group, or a cyclohexyl group, and more preferably a hydrogen atom or a methyl group.

$R^5$ in Formula (E) is preferably a hydrogen atom, a methyl group, or an ethyl group, and more preferably a hydrogen atom.

$R^6$ in Formula (F) is preferably a straight chain alkylene group having 4 to 12 carbon atoms and more preferably a straight chain alkylene group having 8 to 12 carbon atoms.

Y in Formula (A) is preferably represented by Formula (D) or Formula (F), and more preferably Formula (D).

In Formula (G), $z^1$ is preferably an integer of from 5 to 50 and more preferably an integer of from 7 to 20.

A preferable combination of $R^1$, X, Y, Z, $x^1$, $x^2$, $x^3$, and $y^1$ in Formula (A), a preferable combination of $R^2$ and n in Formula (B), and a preferable combination of $R^7$ and $R^5$ in Formula (D) are selected from combinations of the aforementioned preferable ranges.

The siloxane compound that is capable of forming a siloxane structure of the specific polymer (a) according to the invention is preferably a polysiloxane in which each ethylenically unsaturated group of an acrylic group, methacrylic group, fumaroyl group, maleoyl group, itaconoyl group (the structure represented by Y is Formula (D)), an allyl group (the structure represented by Y in Formula (E)), and a vinyl ether group (the structure represented by Y is Formula (F)) in the specific siloxane compound molecule is bonded by an ester bond.

A siloxane compound usable when a siloxane structure is incorporated in the molecule of the specific polymer (a) may be available from commercially available products. For example, there may be mentioned a mono-terminal reactive silicone such as a SILAPLANE series manufactured by CHISSO Corp. (including FM-0711, FM-0721, FM0725, TM-0701, and TM-0701T) or X-22-2404, X-24-8201, X-22-174DX, X-22-2426 or the like manufactured by Shin-Etsu Chemical Co., Ltd.

In addition, the siloxane compound may be synthesized by subjecting a siloxane having a reactive terminal to a reaction with a compound having a radical polymerizable group.

Specific examples of the specific siloxane compound and specific examples of a polymer (polysiloxanes) of the siloxane compound capable of forming the siloxane structure of the specific polymer (a) are described below, but the present invention is not limited to these examples.

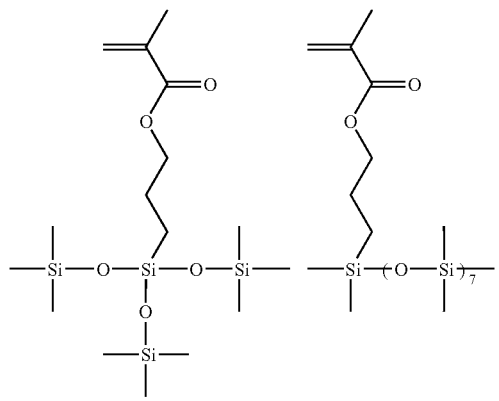

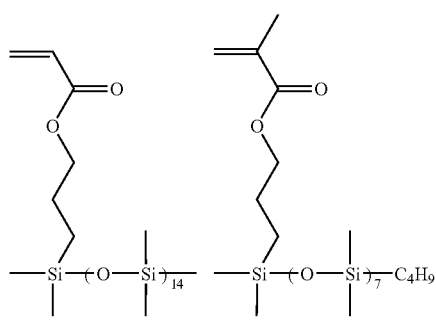

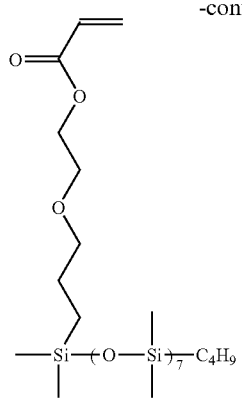

The content of the portion (structural unit of the siloxane structure) derived from the siloxane compound in the specific polymer (a) is, from the viewpoints of surface tension control, solubility, ink viscosity of the ink composition, and the like, from 5 mol % to 60 mol %, more preferably from 10 mol % to 50 mol %, and most preferably from 15 mol % to 40 mol %.

The molecular weight of the portion (structural unit of the siloxane structure) derived from the siloxane compound in the specific polymer (a) is, from the viewpoint of the fact that the specific polymer enhances the surface orientation property of the ink drop, preferably from 300 to 10,000 and more preferably from 300 to 3,000.

(Polymerizable Group)

The specific polymer (a) includes a polymerizable group besides the siloxane structure.

The polymerizable group included in the specific polymer (a) may be a radical polymerizable group or a cationic polymerizable group.

The radical polymerizable group may be a polymerizable group having a radical polymerizable ethylenically unsaturated bond and may be any substituent group as long as the group has at least one radical polymerizable ethylenically unsaturated bond on a side chain of the polymer. Examples of the polymerizable group having a radical polymerizable ethylenically unsaturated bond may include: an unsaturated carboxylic acid ester group such as an acrylic acid ester group, a methacrylic acid ester group, an itaconic acid ester group, a crotonic acid ester group, an isocrotonic acid ester group, or a maleic acid ester group; and a radical polymerizable group such as a styrene group. Among these, a methacrylic acid ester group and an acrylic acid ester group are preferable.

Examples of a method of introducing a radical polymerizable group to produce the specific polymer may include: a method in which the reactivity of a double bond of the radical polymerizable group is sealed with a protective group, and after copolymerization using a monomer having a partial structure sealed with the group to protect the reactivity of the double bond, the protective group is eliminated to recover the reactivity of the double bond; and a method in which a low molecular weight compound having a radical polymerizable group is incorporated to produce the specific polymer through a polymer reaction.

The cationic polymerizable group may include a polymerizable group having a cyclic ether group having a capability of cationic polymerization, and may be any substituent group as long as the group has at least one cyclic ether group having a capability of cationic polymerization on a side chain of the polymer. Examples of the polymerizable group having a cyclic ether group having a capability of cationic polymerization may include: a glycidyl ether group, an alicyclic epoxy group, an oxetanyl group, and a dioxolan group, each of them may be substituted or unsubstituted.

The cationic polymerizable group may be incorporated by radically copolymerizing a compound that has both a radical polymerizable group and a cationic polymerizable group in the molecule.

As a compound suitable for incorporating the cationic polymerizable group, may be suitably used chemical products such as glycidyl methacrylate; CYCLOMER-M-100 and CYCLOMER-A-200 (all manufactured by DAICEL CHEMICAL INDUSTRIES, LTD.); 4HBAGE (manufactured by NIPPON KAYAKU CO., LTD.); MEDOL10, MEDOL30, MIBDOL10, and CHDOL10 (all manufactured by OSAKA ORGANIC CHEMICAL INDUSTRY LTD.); or Epoxy DCP Acrylate, Epoxy DCP Oxyethyl Methacrylate, and Epoxy DCP Methacrylate (all manufactured by ARKEMA Corp.).

As described above, in order to obtain the specific polymer (a), a low molecular weight compound having a double bond precursor or a polymerizable group may be used. Examples of the compound may include a cationic polymerizable compound and a radical polymerizable compound.

As the cationic polymerizable compound, a compound that causes a polymerization reaction and is cured by an action of an acid generated from a compound described later that generates the acid by irradiation of radiation rays is preferably used, and various cationic polymerizable monomers known as photo cationic polymerizable compounds are usable. Examples of the cationic polymerizable compounds may include epoxy compounds, vinyl ether compounds, and oxetane compounds described in Patent Gazette including JP-A Nos. 6-9714, 2001-31892, 2001-40068, 2001-55507, 2001-310938, 2001-310937, and 2001-220526.

The radical polymerizable compound is a compound having a radical polymerizable ethylenically unsaturated bond, and any compound is usable as long as it has at least one radical polymerizable ethylenically unsaturated bond in the molecule, including a chemical form such as monomer, oligomer, or polymer. The radical polymerizable compounds may be used singly, or in a combination of two or more of them may be used in combination in an arbitrary ratio so as to enhance objective properties. Preferably two or more of them may be used in combination from the viewpoint of controlling performance such as reactivity or physical properties.

Examples of the polymerizable compound having a radical polymerizable ethylenically unsaturated bond may include: a radical polymerizable compound such as an unsaturated carboxylic acid including acrylic acid, methacrylic acid, itaconic acid, crotonic acid, isocrotonic acid or maleic acid, or a salt thereof, an anhydride having an ethylenically unsaturated group; acrylonitrile; styrene; or various unsaturated polyesters, unsaturated polyethers, unsaturated polyamides, and unsaturated urethanes.

The content of the structural unit having a polymerizable group in the specific polymer is preferably from 10 mol % to 90 mol %, more preferably from 20 mol % to 80 mol %, and most preferably from 30 mol % to 60 mol %, from the viewpoint of performance of preventing blocking and keeping flexibility.

The specific polymer (a) may include additional copolymerized components besides the siloxane structure and polymerizable group within the range of not impairing the effect of the present invention.

For example, from the viewpoints of improving solubility, improving handling property, and improving scratch resistance, it is also preferable that one or more of radical polymerizable compounds having an adequate copolymerizablility is included as a copolymer unit in a ratio of 50 mol % or less in the specific polymer (a).

In particular, a radical polymerizable compound is preferably used, which provides a homopolymer having a molecular weight of from 10,000 to 100,000 with a glass transition temperature (Tg) of 50° C. or higher, from the viewpoint of controlling the glass transition temperature (Tg) of the whole specific polymer (a).

When the Tg of the homopolymer is 50° C. or higher, the resultant coating film of ink has high hardness and excellent scratch resistance. The Tg of the homopolymer is more preferably 80° C. or higher.

Specific examples of the radical polymerizable compounds may include: isobornyl (meth)acrylate, cyclohexyl(meth)acrylate, tert-butyl(meth)acrylate, methyl methacrylate, ethyl methacrylate, propyl methacrylate, phenyl(meth)acrylate, benzyl(meth)acrylate, phenethyl(meth)acrylate, methyl 2-chloro(meth)acrylate, ethyl α-chloroacrylate, (meth)acrylamide, N-isopropyl acrylamide, and dicylopentanyl(meth)acrylate.

The weight average molecular weight of the specific polymer (a) is, in terms of polystyrene, preferably from 10,000 to 500,000, more preferably from 20,000 to 200,000, and most preferably from 30,000 to 100,000. When the molecular weight of the specific polymer is 10,000 or more, sufficient blocking prevention effect is obtained, while the molecular weight of the specific polymer is 500,000 or less, ejection stability is not impaired. The weight average molecular weight is measured by a method using GPC under the following conditions in terms of polystyrene.

GPC measurement apparatus: HLC8220GPC (manufactured by TOSOH Corp.)

GPC column: TSKgel SuperHZM-H, TSKgel SuperHZ-2000, TSKgel SuperHZ-4000 (all manufactured by TOSOH Corp.)

Flow rate: 0.35 ml/min.

Specific examples (a-1 to a-20) of the specific polymer (a) are described below in terms of repeating structural units with a molar ratio of copolymerization, but the present invention is in no way limited by these examples. All the weight average molecular weight of the specific examples (a-1 to a-20) are in the range of from 10,000 to 120,000.

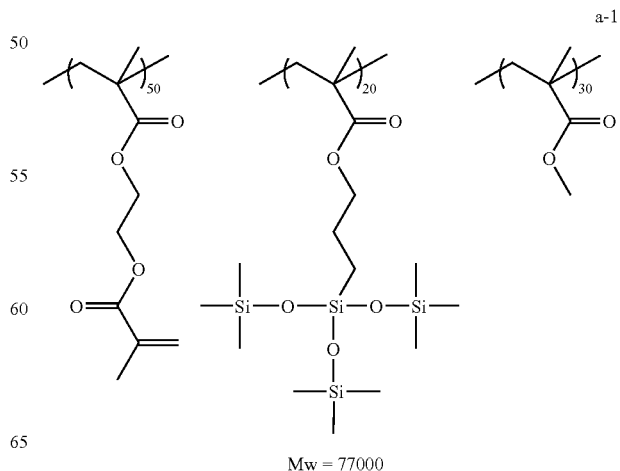

-continued
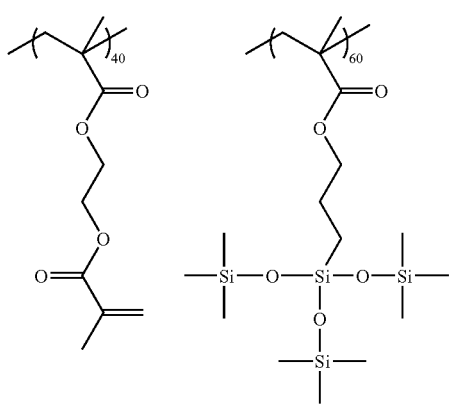
Mw = 110000
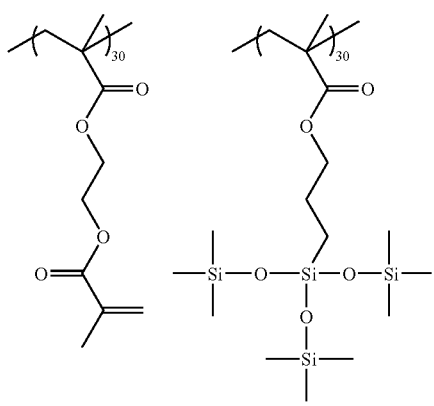
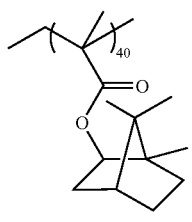
Mw = 80000
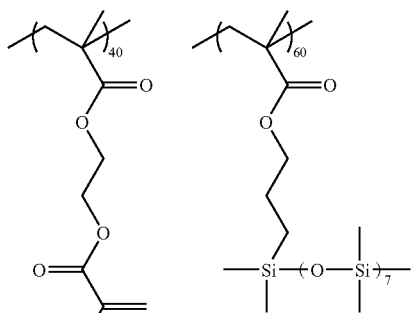
Mw = 65000
a-2
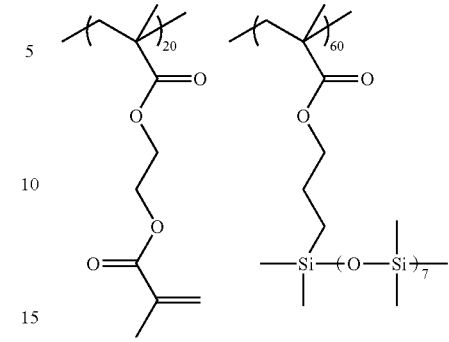
Mw = 48000
a-3
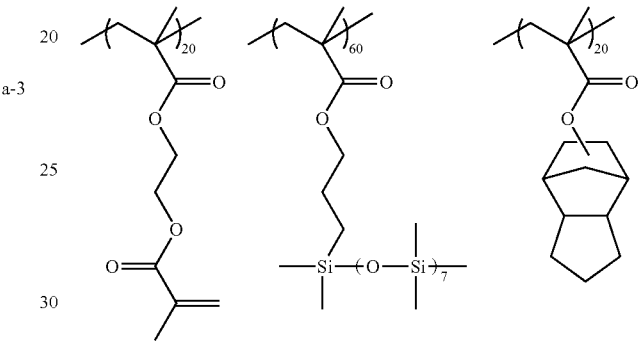
Mw = 52000
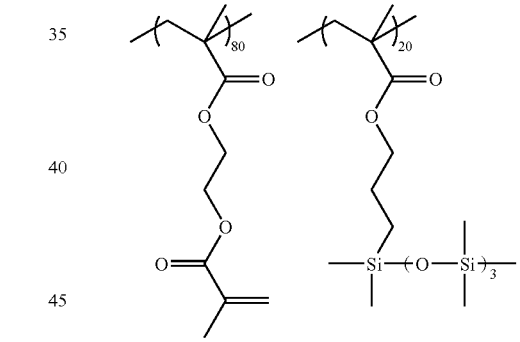
Mw = 26000
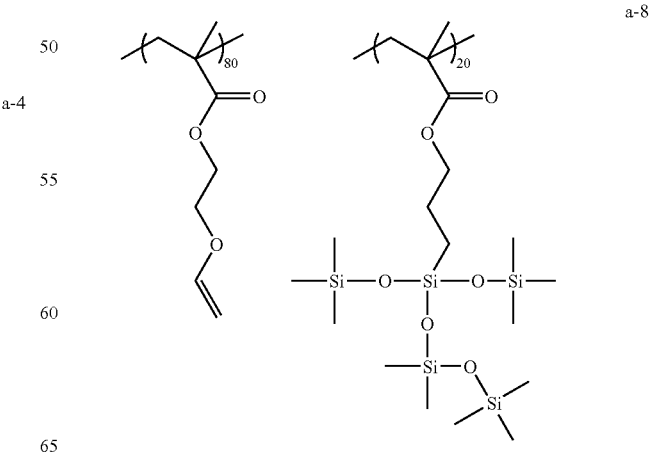
Mw = 12000
a-4
a-5
a-6
a-7
a-8 a-9
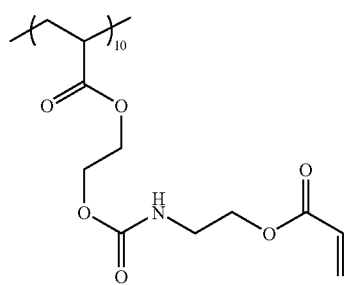
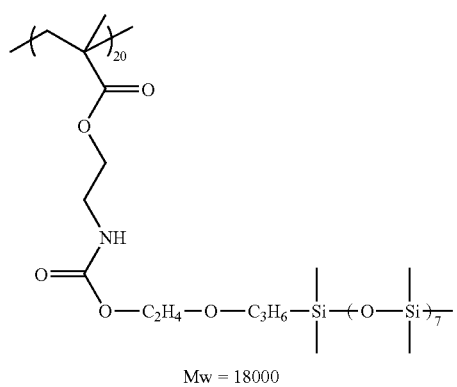
Mw = 18000
a-10
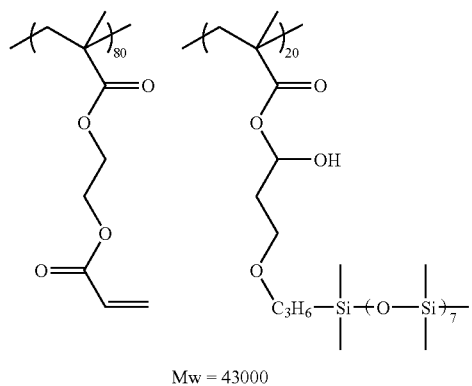
Mw = 43000
a-11
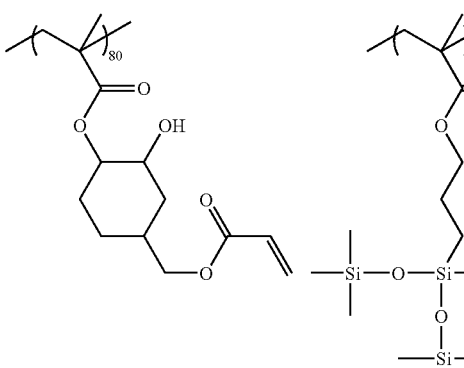
Mw = 30000
a-12
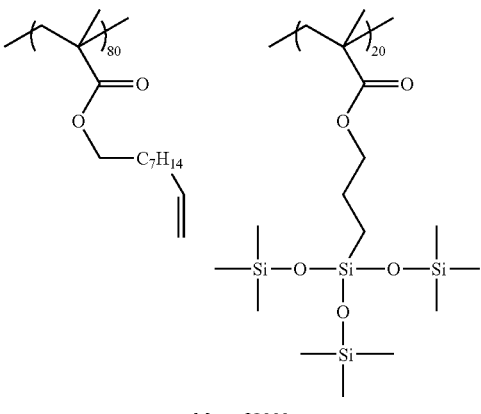
Mw = 28000
a-13
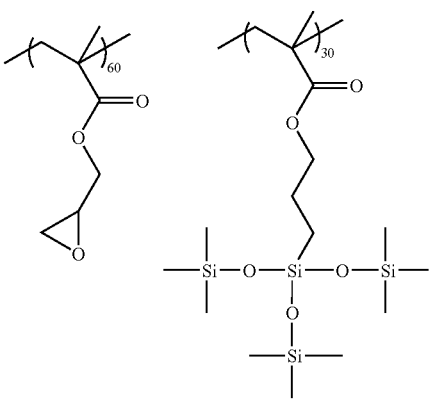
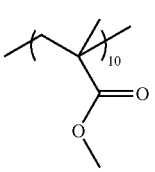
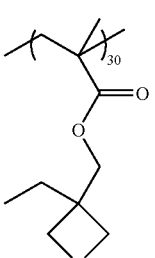
Mw = 68000
a-14
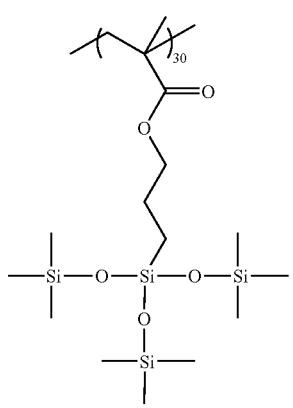

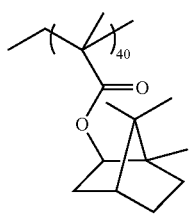

Mw = 59000 a-15

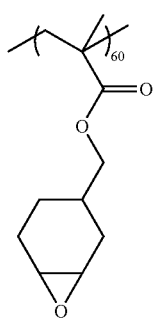

Mw = 70000 a-16

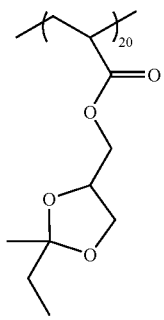

Mw = 62000 a-17

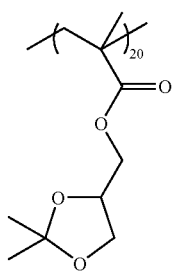

Mw = 58000 a-18

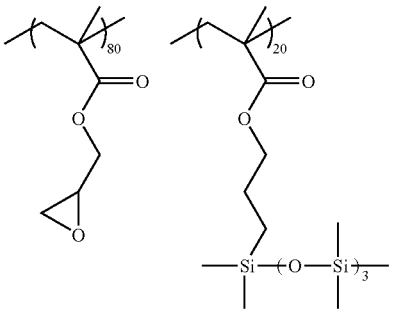

Mw = 66000 a-19

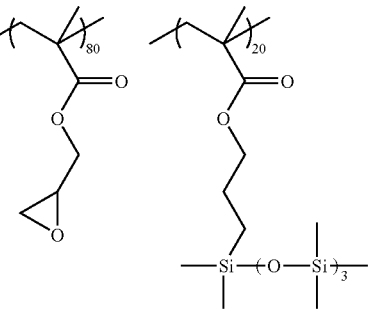

Mw = 120000 a-20

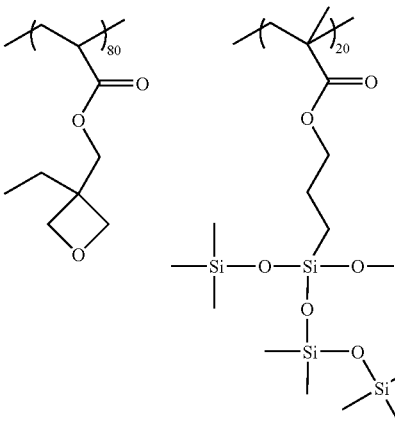

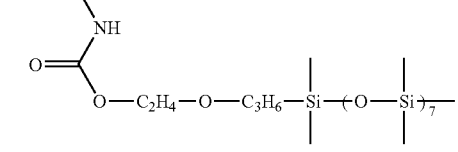

Mw = 40000

To the ink composition of the present invention, the specific polymer (a) may be added singly, or two or more of them may be used in combination.

The content of the specific polymer (a) in the ink composition of the present invention is, with respect to the total solid content of the ink composition, preferably from 0.1% to 10% by mass and more preferably from 0.5% to 5% by mass.

When the content is 0.1% by mass or more, sufficient blocking prevention effect is easily obtained, and when the content is 10% by mass or less, the ejection property is likely not to be deteriorated, which is preferable.

—Polymerizable Compound (b)—

The ink composition of the present invention includes a polymerizable compound (b). The polymerizable compound (b) may be a radical polymerizable compound or a cationic polymerizable compound. The radical polymerizable compound is explained at first.

Radical Polymerizable Compound (b-1)

The radical polymerizable compound usable in the present invention may include the radical polymerizable compounds described in the foregoing description of the specific polymer.

Specific examples of the radical polymerizable compound may include: an acrylic acid derivative such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxy polyethoxy phenyl)propane, polyethylene glycol diacrylate, polypropylene glycol diacrylate, dipentaerythritol tetraacrylate, trimethylolpropane triacrylate, oligoester acrylate, N-methylol acrylamide, diacetone acrylamide, epoxy acrylate, isobornyl acrylate, dicyclopentenyl acrylate, dicyclopentenyloxyethyl acrylate, or dicyclopentanyl acrylate; a methacrylic acid derivative such as methyl methacrylate, n-butyl methacrylate, ally methacrylate, glycidyl methacrylate, benzyl methacrylate, dimethylaminomethyl methacrylate, polyethylene glycol dimethacrylate, polypropylene glycol dimethacrylate, or 2,2-bis(4-methacryloxy polyethoxy phenyl)propane; and additionally, an allyl compound derivative such as allyl glycidyl ether, diallyl phthalate, or triallyl trimellitate. Further, may be used a radical polymerizable or crosslinkable momomer, oligomer or polymer that is commercially available or known in the art and is described in "Kakyozai Handbook" edited by Shinzo Yamashita (1981, published by TAISEISHA LTD.); "UV and EB Kouka Handbook (Genryo Hen)" edited by Kiyoshi Kato (1985, published by Koubunshi Kankou Kai); "UV and EB Kouka Gijutsu No Ouyou To Shijyo" edited by RadTech Japan, page 79, (1989, published by CMC Publishing Co., Ltd.); "Polyester Resin Handbook" by Eiichiro Takiyama (1988, published by THE NIKKAN KOGYO SHIMBUN, LTD.); and the like.

Among these acrylates and methacrylates, from the viewpoints of curing property and film properties after cured, an acrylate of an alcohol having an ether oxygen atom such as tetrahydrofurfuryl acrylate or 2-phenoxyethyl acrylate may be listed as preferred ones.

Further, for the same reason, an acrylate of an alcohol having an alicyclic structure is also preferred. Specific examples of the preferred one may include an acrylate having a bicyclo structure or a tricyclo structure such as isobornyl acrylate, dicyclopentenyl acrylate, dicyclopentenyloxyethyl acrylate, or dicyclopentanyl acrylate. Among these, a particularly preferred one may include dicyclopentenyl acrylate and dicyclopentenyloxyethyl acrylate that have a double bond in the alicyclic structure thereof.

Further, as the radical polymerizable compound, for example, a photo-curing type polymerizable compound that is used for a photo polymerizable composition described in JP-A No. 7-159983, JP-B No. 7-31399, JP-A Nos. 8-224982, 10-863, 9-134011 and JP-W No. 2004-514014 is known and is also usable for the ink composition of the present invention.

In addition, a vinyl ether compound is preferably used in the invention as a radical polymerizable compound. Examples of the vinyl ether compound which is preferably used include: di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, 2-ethylhexyl vinyl ether, hydroxyethyl monovinyl ether, hydroxybutyl vinyl ether, hydroxynonyl monovinyl ether, ethylene glycol monovinyl ether, triethylene glycol monovinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether. Commercially available products such as ™Rapi-Cure DVE-3, ™Rapi-Cure DVE-2 (both made by ISP Europe Co. Ltd.) are also usable as the vinyl ether compound.

Among these vinyl ether compounds, from the viewpoints of curing property, adhesiveness, and surface hardness, divinyl ether compounds and trivinyl ether compounds are preferable, and divinyl ether compounds are particularly preferable. The vinyl ether compounds may be used singly, or two or more of them may be used in combination.

As an additional polymerizable compound, a (meth)acrylic acid ester (hereinafter, referred to as acrylate compounds) such as a (meth)acrylic monomer or prepolymer, an epoxy monomer or prepolymer, or an urethane monomer or prepolymer may be used, and the following compounds may be included as example compounds.

That is, may be included 2-ethylhexyl-diglycol acrylate, 2-hydroxy-3-phenoxypropyl acrylate, 2-hydroxybutyl acrylate, hydroxypivalic acid neopentyl glycol diacrylate, 2-acryloyloxyethyl phthalic acid, methoxy polyethylene glycol acrylate, tetramethylolmethane triacrylate, 2-acryloyloxyethyl-2-hydroxyethyl phthalic acid, dimethyloltricyclodecane diacrylate, ethoxylated phenyl acrylate, 2-acryloyloxyethyl succinic acid, nonylphenol ethylene oxide adduct acrylate, denatured glycerin triacrylate, bisphenol A diglycidyl ether acrylic acid adduct, denatured bisphenol A diacrylate, phenoxy-polyethylene glycol acrylate, 2-acryloyloxyethylhexahydrophthalic acid, propylene oxide adduct diacrylate of bisphenol A, ethylene oxide adduct diacrylate of bisphenol A, dipentaerythritol hexa-acrylate, a pentaerythritol triacrylate tolylene diisocyanate urethane prepolymer, lactone denatured flexible acrylate, butoxyethyl acrylate, propylene glycol diglycidyl ether acrylic acid adduct, a pentaerythritol triacrylate hexamethylene diisocyanate urethane prepolymer, 2-hydroxyethyl acrylate, methoxy dipropylene glycol acrylate, ditrimethylolpropane tetraacrylate, stearyl acrylate, isoamyl acrylate, isomyristyl acrylate, isostearyl acrylate, and lactone denatured acrylate.

These acrylate compounds are preferable, because they are, as a polymerizable compound that has been used for a UV-curing ink so far, less irritative and sensitive to skin, exhibiting a relatively low viscosity and a stable ink ejection property, and are excellent in polymerization sensitivity and adhesive property with the recording medium.

The monomers listed here as additional polymerizable compounds are less sensitive to skin, even the molecular weight thereof is low. In addition, the monomers have high reactivity, low viscosity, and excellent adhesive property with the recording medium.

For the purpose of improving sensitivity, bleeding, and adhesive property with the recording medium, in a preferred embodiment, as the additional polymerizable compound components, a monoacrylate and polyfunctional acrylate monomer or a polyfunctional acrylate oligomer having a molecular weight of 400 or more and preferably 500 or more are used in combination.

Particularly in an ink composition that is used for recording onto a flexible recording medium such as a PET film or a PP film, a combined use of a monoacrylate selected from the foregoing compound group, one selected from the aforementioned specific heterocyclic compounds, and a polyfunctional acrylate monomer or a polyfunctional acrylate oligomer selected from the additional polymerizable compounds is preferable, because, while a resultant film is allowed to have flexibility and the adhesive property thereof is increased, the film strength may be enhanced.

Further, in another preferred embodiment, at least three polymerizable compounds including monomers of monofunctional, bifunctional, and polyfunctional, that is tri- or higher-functional, are used in combination, because sensitivity, bleeding, and adhesive property with the recording medium are still more improved while keeping safety.

Among the monoacrylates, stearyl acrylate, isoamyl acrylate, isomyristyl acrylate, and isostearyl acrylate are preferable, because they are high-sensitive and less shrinking to an extent of preventing curling, also considering bleeding prevention, odor of printed articles, and cost reduction of a radiation apparatus.

As an oligomer that is used in combination with the monoacrylates, an epoxy acrylate oligomer and an urethane acrylate oligomer are particularly preferable.

Note that, methacrylate is more excellent in low skin irritation than acrylate.

Among the foregoing compounds, it is preferable that alkoxy acrylates are used in an amount of 70% by mass or less and acrylate is used as the remainder, because adequate sensitivity, bleeding property, and odor property are obtainable.

As the radical polymerizable compound used in the present invention, from the viewpoints of curing rate, flexibility after cured, and adhesive property with the recording medium, a compound having a nitrogen atom and a polymerizable unsaturated bond in the molecule is preferable. At least one selected from (meth)acrylates having a nitrogen atom or N-vinyl lactams is preferable.

Examples of the compound having a nitrogen atom and a polymerizable unsaturated bond in the molecule usable in the present invention may include: a compound selected from N-vinylamides having an amido group or a lactam ring in the molecule and such a structure that the nitrogen atom of the amido group or lactam ring is substituted by a vinyl group; a compound having an amido group in the molecule; and a (meth)acrylate having a tertiary amine structure in the molecule.

As the compound having a nitrogen atom and a polymerizable unsaturated bond in the molecule, from the viewpoints of physical properties of a cured film after cured and adhesion between the cured film and a recording medium, N-vinylamides having a structure in which the nitrogen atom of the amido group or lactam ring is substituted by a vinyl group are preferable. Among the N-vinylamides, from the viewpoints of safety and availability, N-vinyl lactams having a structure in which the nitrogen atom of the lactam ring is replaced by a vinyl group is more preferable.

When the compound having a nitrogen atom and a polymerizable unsaturated bond in the molecule is the N-vinyl lactams, the number of the lactam ring members of the N-vinyl lactams is preferably from 5 to 7, from the viewpoints of the stability of the compound, solubility in the ink composition, availability, and the like. Such N-vinyl lactams may include specifically preferably N-vinyl pyrrolidone having a five-membered ring structure or N-vinyl caprolactam having a seven-membered ring structure, and particularly preferably N-vinyl caprolactam.

Another example of the N-vinyl amides useable as the compound having a nitrogen atom and a polymerizable unsaturated bond in the molecule may include N-vinylacetamide, N-vinylformamide, N-methyl-N-vinylacetamide, and N-methyl-N-vinylformamide.

On the other hand, examples of the (meth)acrylates having a tertiary amine structure in the molecule usable as the compound having a nitrogen atom and a polymerizable unsaturated bond in the molecule may include preferably 1,2,2,6,6-pentamethyl-4-methacryloxy piperidine (FA-711MM, manufactured by Hitachi Chemical Co., Ltd.) and amine-denatured acrylates (for example, CN2100, CN501, CN550, CN551 or the like, manufactured by Sartomer Corp.).

Further, examples of the (meth)acrylates having an amido group in the molecule usable as the compound having a nitrogen atom and a polymerizable unsaturated bond in the molecule may include preferably 4-acryloylmorpholine, diacetone acrylamide, and diisopropylacrylamide.

The content of the compound having a nitrogen atom and a polymerizable unsaturated bond in the molecule in the ink composition of the present invention is, from the viewpoints of curing rate, adhesion between a cured film and a recording medium, and the film properties of the cured film after cured, with respect to the total mass of the ink composition, preferably in a range of from 1% to 35% by mass, more preferably from 3% to 30% by mass, and more preferably from 5% to 26% by mass.

Cationic Polymerizable Compound (b-2)

The cationic polymerizable compound usable in the present invention is not specifically limited as long as it is a compound which causes a polymerization reaction by an acid generated from a photo-acid generator, and is cured. Various cationic polymerizable monomers publicly known as a photo cationic polymerizable compound may be used. Examples of the cationic polymerizable compound include epoxy compounds, vinyl ether compounds, and oxetane compounds described in JP-A No. 6-9714, JP-A Nos. 2001-31892, 2001-40068, 2001-55507, 2001-310938, 2001-310937, 2001-220526, and the like.

The epoxy compound includes an aromatic epoxide, an alicyclic epoxide, and an aliphatic epoxide.

The aromatic epoxide includes a di- or poly-glycidyl ether produced by a reaction between epichlorohydrin and polyphenol having at least one aromatic nucleus, or an alkylene oxide adduct thereof. Examples thereof include a di- or poly-glycidyl ether of bisphenol A or its alkylene oxide adduct, di- or poly-glycidyl ether of hydrogenated bisphenol A or its alkylene oxide adduct, and novolac type epoxy resin. Here, the alkylene oxide includes ethylene oxide and propylene oxide.

The alicyclic epoxide preferably includes a cyclohexene oxide or cyclopentene oxide comprising compound obtained by epoxidizing a compound having at least one cycloalkane ring such as a cyclohexene or cyclopentene ring, by a suitable oxidizer such as hydrogen peroxide or peroxy acid.

The aliphatic epoxide includes a di- or poly-glycidyl ether of aliphatic polyalcohol or its alkylene oxide adduct. The representative examples thereof include: diglycidyl ether of alkylene glycol such as diglycidyl ether of ethylene glycol, diglycidyl ether of propylene glycol, or diglycidyl ether of 1,6-hexanediol; polyglycidyl ether of polyalcohol such as di- or tri-glycidyl ether of glycerin or its alkylene oxide adduct; and diglycidyl ether of polyalkylene glycol represented by diglycidyl ether of polyethylene glycol or its alkylene oxide adduct, and diglycidyl ether of polypropylene glycol or its alkylene oxide adduct. Here, the alkylene oxide includes ethylene oxide and propylene oxide.

The epoxy compound may be either monofunctional or polyfunctional.

Examples of the monofunctional epoxy compound used in the present invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Moreover, examples of the polyfunctional epoxy compound include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexanecarboxylate, methylenebis(3,4-epoxycyclohexane), dicyclopentadiene diepoxide, di(3,4-epoxycyclohexylmethyl)ether of ethylene glycol, ethylenebis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, and 1,2,5,6-diepoxycyclooctane.

Among these epoxy compounds, aromatic epoxide and alicyclic epoxide are preferred from the viewpoint of superior curing rate, in particular alicyclic epoxide is preferred.

Examples of the vinyl ether compound include: di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether.

The vinyl ether compound may be either monofunctional or polyfunctional.

Specifically, examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether.

Moreover, examples of the polyfunctional vinyl ether include: divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide adduct trimethylolpropane trivinyl ether, propylene oxide adduct trimethylolpropane trivinyl ether, ethylene oxide adduct ditrimethylolpropane tetravinyl ether, propylene oxide adduct ditrimethylolpropane tetravinyl ether, ethylene oxide adduct pentaerythritol tetravinyl ether, propylene oxide adduct pentaerythritol tetravinyl ether, ethylene oxide adduct dipentaerythritol hexavinyl ether, and propylene oxide adduct dipentaerythritol hexavinyl ether.

As the vinyl ether compound, from the viewpoints of curability, adhesion with the recording medium, and surface hardness of the formed image, di- or tri-vinyl ether compounds are preferred, in particular divinyl ether compounds are preferred.

The oxetane compound in the present invention denotes a compound having an oxetane rings, and publicly known oxetane compounds such as described in JP-A Nos. 2001-220526, 2001-310937, and 2003-341217 may be optionally selected and used.

The oxetane ring-comprising compound employable for the polymerizable composition of the present invention which is curable by irradiation of actinic radiation ray is preferably a compound having 1 to 4 oxetane rings in its structure. By using such a compound, the viscosity of the composition can be readily kept within a range of excellent handling properties, and a high adhesin between the cured composition and the recording medium can be obtained.

The compound having 1 or 2 oxetane rings in the molecule includes the compounds represented by any of the following Formulae (1) through (3).

Formula (1)

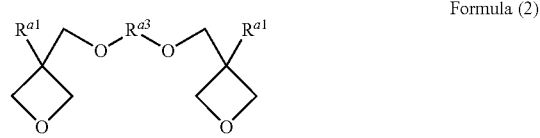

Formula (2)

Formula (3)

In Formulae (1) through (3), $R^{a1}$ represents a hydrogen atom, an alkyl group having 1 to 6 carbon atoms, a fluoroalkyl group having 1 to 6 carbon atoms, an allyl group, an aryl group, a furyl group, or a thienyl group. When there are two $R^{a1}$s in the molecule, they may be the same or different.

The alkyl group includes a methyl group, an ethyl group, a propyl group, and a butyl group. Preferred examples of the fluoroalkyl group include the one in which any one of the hydrogens of the alkyl group is substituted by a fluorine atom.

In Formula (1), $R^{a2}$ represents a hydrogen atom, an alkyl group having 1 to 6 carbon atoms, an alkenyl group having 2 to 6 carbon atoms, a group having an aromatic ring, an alkylcarbonyl group having 2 to 6 carbon atoms, an alkoxycarbonyl group having 2 to 6 carbon atoms, or an N-alkylcarbamoyl group having 2 to 6 carbon atoms. The alkyl group includes a methyl group, an ethyl group, a propyl group, and a butyl group. The alkenyl group includes a 1-propenyl group, a 2-propenyl group, a 2-methyl-1-propenyl group, a 2-methyl-2-propenyl group, a 1-butenyl group, a 2-butenyl group, and a 3-butenyl group. The group having an aromatic ring includes a phenyl group, a benzyl group, a fluorobenzyl group, a methoxybenzyl group, and a phenoxyethyl group. The alkylcarbonyl group includes an ethylcarbonyl group, a propylcarbonyl group, and a butylcarbonyl group. The alkoxycarbonyl group includes an ethoxycarbonyl group, a propoxycarbonyl group, and a butoxycarbonyl group.

The N-alkylcarbamoyl group includes an ethylcarbamoyl group, a propylcarbamoyl group, a butylcarbamoyl group, and a pentylcarbamoyl group.

In Formula (2), $R^{a3}$ represents a straight chain or branched alkylene group, a straight chain or branched poly(alkylene oxy) group, a straight chain or branched unsaturated hydrocarbon group, a carbonyl group, an alkylene group including a carbonyl group, an alkylene group including a carboxy group, an alkylene group including a carbamoyl group, or the following groups. Examples of the alkylene group include an ethylene group, a propylene group, and a butylene group. The poly(alkylene oxy) group includes a poly(ethylene oxy) group and a poly(propylene oxy) group. The unsaturated hydrocarbon group includes a propenylene group, a methylpropenylene group, and a butenylene group.

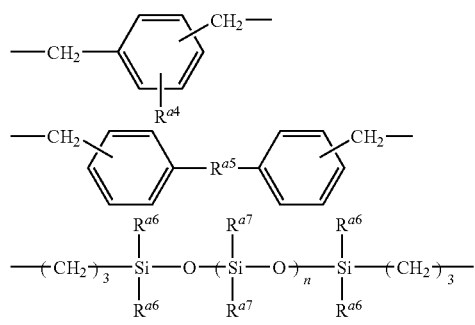

In the above polyvalent groups, $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkylcarboxy group, a carboxy group, or a carbamoyl group.

$R^{a5}$ represents an oxygen atom, a sulfur atom, a methylene group, NH, SO, $SO_2$, $C(CF_3)_2$, or $C(CH_3)_2$.

$R^{a6}$ represents an alkyl group or an aryl group having 1 to 4 carbon atoms. n is an integer of from 0 to 2000.

$R^{a7}$ represents an alkyl group having 1 to 4 carbon atoms, an aryl group, or a monovalent group having the following structure.

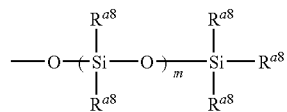

In the above monovalent group, $R^{a8}$ represents an alkyl group or aryl group having 1 to 4 carbon atoms or an aryl group. m is an integer of from 0 to 100.

The compound having 3 or 4 oxetane rings includes the compounds represented by the following Formula (4).

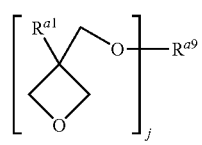

Formula (4)

In Formula (4), $R^{a1}$ has the same meaning as $R^{a1}$ in Formula (1). And, $R^{a9}$ is a polyvalent connecting group. Examples thereof include a branched alkylene group having 1 to 12 carbon atoms such as groups represented by each of (J) to (L) below, a branched poly(alkylene oxy) group such as a group represented by (M) below, and a branched polysiloxy group such as a group represented by (N) below. j is 3 or 4.

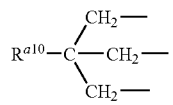 (J)

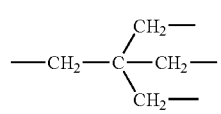 (K)

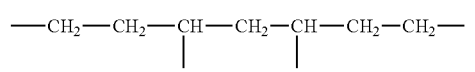 (L)

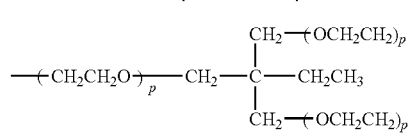 (M)

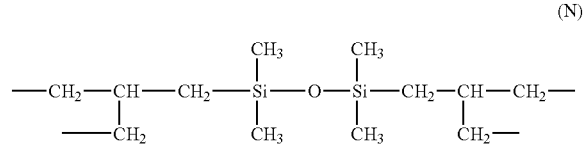 (N)

In the above (J), $R^{a10}$ represents a methyl group, an ethyl group, or a propyl group. In the above (M), p is an integer of from 1 to 10.

Another embodiment of the oxetane compound suitably used in the present invention includes a compound represented by the following Formula (5) having an oxetane ring on a side chain thereof

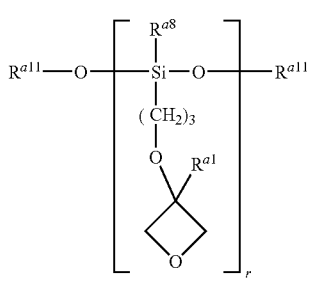

Formula (5)

In Formula (5), $R^{a1}$ has the same meaning as $R^{a1}$ in Formula (1). And, $R^{a8}$ has the same meaning as $R^{a8}$ in the above monovalent group. $R^{a11}$ represents an alkyl group having 1 to 4 carbon atoms such as a methyl group, an ethyl group, a propyl group, or a butyl group, or a trialkylsilyl group. r is 1 to 4.

Examples of such an oxetane ring-comprising compound are described in detail in JP-A No. 2003-341217, paragraphs [0021] to [0084]. The compounds described therein can also be suitably used in the present invention.

Among the oxetane compounds used in the present invention, a compound having one oxetane ring is preferably used from the viewpoints of viscosity and cohesiveness of the composition.

The radical polymerizable compound (b-1) or the cationic polymerizable compound (b-2) used as the polymerizable compound (b) may be used singly or in combination of two or more of them.

The content of the radical polymerizable compound (b-1) and the cationic polymerizable compound (b-2) used as the polymerizable compound (b) is, from the viewpoints of curing rate, adhesion of a cured film onto a recording medium, and film properties after cured, with respect to the total solid content of the ink composition, preferably in the range of from 60% to 90% by mass, more preferably from 65% to 90% by mass, and still more preferably from 70% to 85% by mass. The amount of the polyfunctional monomers added to keep the flexibility of the coating film is, with respect to the total solid content of the ink composition, preferably from 0% to 20% by mass, more preferably from 0% to 10% by mass, and most preferably from 0% to 5% by mass.

—Photo Initiator (c)—

The ink composition of the present invention includes a photo initiator (c).

The photo initiator (c) may be selected from known polymerization initiators and used appropriately in accordance with the polymerizable compounds used in combination and the intended purposes of the ink compositions.

The photo initiator (c) used for the ink composition of the present invention is a compound that absorbs an external energy (light) and generates initiators for polymerization. Examples of the light may include: active radiation rays, that is, γ rays, β rays, electron beams, UV rays, visible rays, and infrared rays.

As the photo initiator (c), known compounds are usable, but examples of the photo initiator (c) preferably usable in the present invention may include: aromatic ketones (A), acylphosphine oxide compounds (B), aromatic onium salt compounds (C), organic peroxides (D), thio compounds (E), hexaaryl biimidazole compounds (F), keto-oxime ester compounds (G), borate compounds (H), azinium compounds (I), metallocene compounds (J), active ester compounds (K), compounds having a carbon-halogen bond (L), and alkylamine compounds (M).

In the present invention, the photo initiator (c) may be used singly or in combination. From the viewpoint of effect, two or more photo initiator (c)s are preferably used in combination.

Specific examples of the photo initiator (c) used in the present invention may include: benzoin isobutyl ether, 2,4-diethylthioxanthone, 2-isopropylthioxanthone, dibenzoyl, 2,4,6-trimethylbenzoyldiphenyl phosphine oxide, 2-benzyl-2-dimethylamino-1-(4-morpholinophenyl)-butan-1-one, bis(2,4,6-trimethoxybenzoyl)-2,4,4-trimethylpentylphosphine oxide, 1,2-octane-dione, and 1-(4-phenylthio)-2,2-(O-benzoyloxime)). Further, besides these, as a molecule-cleavage initiator, may be used in combination 1-hydroxycyclohexyl phenyl ketone, benozoine ethyl ether, benzyl dimethyl ketal, 2-hydroxy-2-methyl-1-phenylpropan-1-one, 1-(4-isopropylphenyl)-2-hydroxy-2-methylpropan-1-one, 2-methyl-1-(4-methylthiophenyl)-2-morpholinopropan-1-one, and the like. Still further, a hydrogen-abstraction photo initiator may be also used in combination, which includes benzophenone, 4-phenylbenzophenone, isophthal phenone, 4-benzoyl-4'-methyl-diphenyl sulfide.

The content of the photo initiator (c) in the present invention is, with respect to the total solid content of the ink composition of the present invention, preferably in the range of from 1% to 50% by mass, more preferably from 2% to 40% by mass, and still more preferably from 5% to 35% by mass.

—Additional Components—

To the ink composition of the present invention, in addition to the essential components of the above described (a) to (c), additional components may be used in combination so as to improve physical properties and others as long as the effect of the present invention is not impaired.

Hereinafter, these optional components will be described.

[Colorant]

By adding a colorant into the ink composition of the present invention, a visible image can be formed. For example, in the case where an image area on a planographic printing plate is to be formed, a colorant is not necessarily added. However, a colorant is preferably used from the viewpoint of detectability of the obtained planographic printing plate.

The employable colorant is not specifically limited, and various publicly known colorants (pigments and dyes) may be suitably selected and used according to the usage. For example, in the case where an image having an excellent weather resistance is to be formed, a pigment is preferred. As a dye, either one of a water soluble dye or an oil soluble dye may be used, however an oil soluble dye is preferred.

(Pigment)

The pigment preferably used in the invention is described.

The pigment is not particularly limited, and any commercially available organic and inorganic pigment, a pigment dispersed in an insoluble resin or the like as a dispersion medium, or a pigment having a resin grafted on the surface thereof can be used. Resin particles dyed with a dye can also be used.

Examples of these pigments include the pigments described in Seijiro Ito "Pigment dictionary" (2000), W. Herbst, K. Hunger "Industrial Organic Pigments", JP-A No. 2002-12607, JP-A No. 2002-188025, JP-A No. 2003-26978, and JP-A No. 2003-342503.

Specific examples of the organic and inorganic pigments exhibiting, for example, yellow color employable in the present invention, include a monoazo pigment such as C.I. Pigment Yellow 1 (e.g., Fast Yellow G), and C.I. Pigment Yellow 74, a disazo pigment such as C.I. Pigment Yellow 12 (e.g., Disazo Yellow AAA) and C.I. Pigment Yellow 17, a non-benzidine azo pigment such as C.I. Pigment Yellow 180, an azo lake pigment such as C.I. Pigment Yellow 100 (e.g., Tartrazine Yellow Lake), a condensed azo pigment such as C.I. Pigment Yellow 95 (e.g., Condensed Azo Yellow GR), an acidic dye lake pigment such as C.I. Pigment Yellow 115 (e.g., Quinoline Yellow Lake), a basic dye lake pigment such as C.I. Pigment Yellow 18 (e.g., Thioflavin Lake), an anthraquinone pigment such as Flavanthrone Yellow (Y-24), an isoindolinone pigment such as Isoindolinone Yellow 3RLT (Y-110), a quinophthalone pigment such as Quinophthalone Yellow (Y-138), an isoindoline pigment such as Isoindoline Yellow (Y-139), a nitroso pigment such as C.I. Pigment Yellow 153 (e.g., Nickel Nitroso Yellow), and a metallic complex azomethine pigment such as C.I. Pigment Yellow 117 (e.g., Copper Azomethine Yellow).

Examples thereof exhibiting red or magenta color include a monoazo pigment such as C.I. Pigment Red 3 (e.g., Toluidine Red), a disazo pigment such as C.I. Pigment Red 38 (e.g., Pyrazolone Red B), an azo lake pigment such as C.I. Pigment Red 53:1 (e.g., Lake Red C) and C.I. Pigment Red 57:1 (e.g., Brilliant Carmine 6B), a condensed azo pigment such as C.I. Pigment Red 144 (e.g., Condensed Azo Red BR), an acidic dye lake pigment such as C.I. pigment red 174 (e.g., Phloxin B lake), a basic dye lake pigment such as C.I. Pigment Red 81 (e.g., Rhodamine 6G' Lake), an anthraquinone pigment such as C.I. Pigment Red 177 (e.g., Dianthraquinonyl Red), a thioindigo pigment such as C.I. Pigment Red 88 (e.g., Thioindigo Bordeaux), a perynone pigment such as C.I. Pigment Red 194 (e.g., Perynone Red), a perylene pigment such as C.I. Pigment Red 149 (e.g., Perylene Scarlett), a quinacridone pigment such as C.I. Pigment Violet 19 (unsubstituted quinacridone), C.I. Pigment Red 122 (e.g., Quinacridone Magenta), an isoindolinone pigment such as C.I. Pigment Red 180 (e.g., Isoindolinone Red 2BLT), and an alizarin lake pigment such as C.I. Pigment Red 83 (e.g., Madder Lake).

Examples thereof exhibiting blue or cyan color include a disazo pigment such as C.I. Pigment Blue 25 (e.g., Dianisidine Blue), a phthalocyanine pigment such as C.I. Pigment Blue 15 (e.g., Phthalocyanine Blue), an acidic dye lake pigment such as C.I. Pigment Blue 24 (e.g., Peacock Blue Lake), a basic dye lake pigment such as C.I. Pigment Blue 1 (e.g., Victoria Pure Blue BO Lake), an anthraquinone pigment such as C.I. Pigment Blue 60 (e.g., Indanthrone Blue), and an alkali blue pigment such as C.I. Pigment Blue 18 (e.g., Alkali Blue V-5:1).

Examples thereof exhibiting green color include a phthalocyanine pigment such as C.I. Pigment Green 7 (Phthalocyanine Green), and C.I. Pigment Green 36 (Phthalocyanine Green), and an azo metal complex pigment such as C.I. Pigment Green 8 (Nitroso Green).

Examples thereof exhibiting orange color include an isoindolin pigment such as C.I. Pigment Orange 66 (Isoindolin Orange), and an anthraquinone pigment such as C.I. Pigment Orange 51 (Dichloropyranthrone Orange).

Examples thereof exhibiting black color include carbon black, titanium black, and aniline black.

As specific examples of white pigment, basic lead carbonate ($2PbCO_3Pb(OH)_2$, so-called silver white), zinc oxide (ZnO, so-called zinc white), titanium oxide ($TiO_2$, so-called, titanium white), and strontium titanate ($SrTiO_3$, so-called titanium strontium white) are employable.

Here, titanium oxide has a lesser specific gravity and a greater refractive index, and is chemically and physically stable, compared to other white pigments. Therefore, it has a greater concealing and tinting power as a pigment, and furthermore has a superior durability against acid, alkali, and other environments. Therefore, the titanium oxide is preferably used as a white pigment. Of course, other white pigments (which may be other than the abovementioned white pigments) may be used as necessary.

For dispersing the pigment, respective dispersing devices such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, and a wet type jet mill may be used.

Dispersing agents can also be added when a pigment is to be dispersed. Examples of the dispersing agent include a hydroxy group comprising carboxylate ester, a salt of long-chain polyaminoamide and high molecular weight acid ester, a salt of high molecular weight polycarboxylate, a high molecular weight unsaturated acid ester, a high molecular weight copolymer, a modified polyacrylate, an aliphatic polyvalent carboxylic acid, a naphthalenesulfonic acid-formalin condensate, a polyoxyethylenealkyl phosphate ester, and pigment derivatives. Moreover, a commercially available polymer dispersing agent such as a Solsperse series made by Zeneca Co. may be preferably used.

As a dispersing auxiliary, a synergist according to various types of pigments may be used. 1 to 50 parts by mass of the dispersing agent and the dispersing auxiliary are preferably added with respect to 100 parts by mass of the pigment.

In the ink composition, a solvent may be added as a dispersion medium for various components such as a pigment. Moreover, the polymerizable compound (b) serving as a low molecular weight component may be used as a dispersion medium, without any solvent. Since the ink composition of the present invention is a radiation ray curable ink, and the ink is cured after the application onto the recording medium, it is preferred not to use a solvent. The reason is that, if the solvent remains in a cured ink image, problems that, for example, the solvent resistance is degraded and the like, would occur. From such a viewpoint, polymerizable compound (b)s are preferably used as the dispersion medium. Among these, a radical polymerizable compound having the lowest viscosity is preferably selected from the viewpoints of improving dispersing properties, and improving handling properties of the ink composition.

The mean particle diameter of the pigment is preferably from 0.02 μm to 14 μm, more preferably from 0.02 μm to 0.1 μm, and even more preferably within a range of from 0.02 μm and 0.07 μm.

In order to set the mean particle diameter of the pigment particle within the preferable range, a pigment, a dispersing agent, and a dispersing medium are selected, and dispersing and filtering conditions are set. Such control of the particle diameter prevents clogging at the jet nozzle, and keeps the ink storage stability, the ink transparency, and the curing sensitivity.

[Dye]

The dye used in the present invention is preferably oil soluble. Specifically, it means a dye having a solubility in water (mass of dye soluble in 100 g of water) at 25° C. of 1 g or less 1 g, preferably 0.5 g or less, and more preferably 0.1 g or less. Therefore, a so-called oil soluble dye that is water insoluble, is preferably used.

In the dye used in the present invention, an oil soluble group is preferably introduced into the skeleton of the abovementioned dyes so as to dissolve the required amount thereof into the ink composition.

Examples of the oil soluble group include: a long-chain or branched alkyl group, a long-chain or branched alkoxy group, a long-chain or branched alkylthio group, a long-chain or branched alkylsulfonyl group, a long-chain or branched acyloxy group, a long-chain or branched alkoxycarbonyl group, a long-chain or branched acyl group, a long-chain or branched acylamino group, a long-chain or branched alkylsulfonylamino group, a long-chain or branched alkylaminosulfonyl group; and an aryl group, an aryloxy group, an aryloxycarbonyl group, an arylcarbonyloxy group, an arylaminocarbonyl group, an arylaminosulfonyl group, and an arylsulfonylamino group including the above long-chain or branched substituents.

Moreover, a dye may be obtained, with respect to a water soluble dye having a carboxy group or a sulfonic acid group, by converting into an alkoxycarbonyl group, an aryloxy carbonyl group, an alkylaminosulfonyl group, and an arylaminosulfonyl group serving as an oil soluble group, using a long-chain or branched alcohol, amine, phenol, and aniline derivatives.

The oil soluble dye preferably has a melting point of 200° C. or less, more preferably, a melting point of 150° C. or less, and even more preferably a melting point of 100° C. or less. The use of an oil-soluble dye having a low melting point suppresses the precipitation of dye crystals in the ink composition, and therefore the storage stability of the ink composition is improved.

Moreover, in order to improve the resistance against discoloration, in particular against an oxidizer such as ozone, and to improve the curing property, the oxidation potential is desirably noble (high). Therefore, the oil soluble dye used in the present invention preferably has an oxidation potential of 1.0V or higher (vs SCE). The oxidation potential is preferably higher, more preferably 1.1V or higher (vs SCE), and even more preferably 1.15V or higher (vs SCE).

As a dye of yellow color, preferred are the compounds having a structure represented by Formula (Y-I) described in JP-A No. 2004-250483.

Particularly preferred dye includes the dyes represented by Formulae (Y-II) through (Y-IV) described in JP-A No. 2004-250483, paragraph [0034]. Specific examples thereof include the compounds described in JP-A No. 2004-250483, paragraphs [0060] to [0071]. The oil soluble dye represented by Formula (Y-I) described in the document may be used for an ink of any color such as a black ink and a red ink as well as the yellow one.

As a dye of magenta color, preferred are the compounds having a structure represented by Formulae (3) and (4) described in JP-A No. 2002-114930. Specific examples thereof include the compounds described in JP-A No. 2002-114930, paragraphs [0054] to [0073].

Particularly preferred dye includes the azo dyes represented by Formulae (M-1) and (M-2) described in JP-A No. 2002-121414, paragraphs [0084] to [0122]. Specific examples thereof include the compounds described in JP-A No. 2002-121414, paragraphs [0123] to [0132]. The oil soluble dye represented by Formulae (3), (4), (M-1), and (M-2) described in the document may be used for an ink of any color such as a black ink and a red ink as well as the magenta one.

As a dye of cyan color, preferred are the dyes represented by Formulae (1) through (IV) described in JP-A No. 2001-181547, and the dyes represented by Formulae (IV-1) through (IV-4) described in JP-A No. 2002-121414, paragraphs [0063] to [0078]. Specific examples thereof include the compounds described in JP-A No. 2001-181547, paragraphs [0052] to [0066], and the compounds described in JP-A No. 2002-121414, paragraphs [0079] to [0081].

Particularly preferred dye includes the phthalocyanine dyes represented by Formulae (C-I) and (C-II) described in JP-A No. 2002-121414, paragraphs [0133] to [0196], and furthermore the phthalocyanine dyes represented by Formula (C-II). Specific examples thereof include the compounds described in JP-A No. 2002-121414, paragraphs [0198] to [0201]. The oil soluble dye represented by Formulae (1) to (IV), (IV-1) through (IV-4), (C-I), and (C-II) may be used for an ink of any color such as a black ink and a green ink as well as the cyan one.

(Oxidation Potential)

The oxidation potential value (Eox) of the dye of the present invention can be easily measured by one skilled in the art. The method therefor is described, for example, in P. Delahay, New Instrumental Methods in Electrochemistry, Interscience Publishers (1954), A. J. Bard et al., Electrochemical Methods, John Wiley & Sons (1980), and Akira Fujishima et al., Denkikagaku Sokutei Ho (Electrochemical Measuring Method), Gihodo Shuppan Sha (1984).

Specifically, a test sample is dissolved to a concentration of from $1 \times 10^{-2}$ mol/L to $1 \times 10^{-6}$ mol/L in a solvent such as dimethylformamide or acetonitrile comprising a supporting electrolyte such as sodium perchlorate or tetrapropylammonium perchlorate, and the oxidation potential is measured as a value with respect to SCE (saturated calomel electrode) by a cyclic voltammetry or a direct current polarography apparatus, using the intermediate potential value of a line segment made from: an intersection of an approximated line of an oxidation wave when swept to the oxidization side (nobler side) using a carbon (GC) as an active electrode and a rotating platinum electrode as a counter electrode, and a remaining current/potential line; and an intersection of a line and a saturated current line (or an intersection with a line in parallel to a vertical axis passing through the peak potential value). This value sometimes deviates in the order of several tens of millivolt due to the effect of, for example, the liquid junction potential or the liquid resistance of the sample solution, but the reproducibility of the potential can be guaranteed by adding a standard sample (for example, hydroquinone). The supporting electrolyte and the solvent to be used may be appropriately selected depending on the oxidation potential or the solubility of the sample. The employable supporting electrolyte and the solvent are described in Akira Fujishima, et al., Denki Kagaku Sokutei-ho, 1984, Gihodo Shuppan Co., Ltd., pages 101 to 118.

Regarding these colorants, from 1% to 20% by mass in terms of solid contents are preferably added, and more preferably from 2% to 10% by mass.

When the content of the colorant is 1% by mass or more, the color density of the ink may be sufficient, and when the content is 20% by mass or less, the curability of the ink composition may tend to be not deteriorated, which is preferable.

[Ultraviolet Absorber]

In the present invention, an ultraviolet absorber may be used from the viewpoints of improving the weather resistance and preventing discoloration of the obtained image.

Examples of the ultraviolet absorber include benzotriazol compounds described in JP-A Nos. 58-185677, 61-190537, 02-782, 05-197075 and 09-34057; benzophenone compounds described in JP-A Nos. 46-2784 and 05-194483, and U.S. Pat. No. 3,214,463; cinnamic acid compounds described in JP-B Nos. 48-30492 and 56-21141, and JP-A No. 10-88106; triazine compounds described in JP-A Nos. 04-298503, 08-53427, 08-239368, and 10-182621, and JP-W No. 08-5012911; compounds described in Research Disclosure No. 24239; and compounds which absorb ultraviolet rays to generate fluorescence, such as stilbene and benzoxazol compounds, being so-called fluorescent brightening agents.

The addition amount is suitably selected according to the object, however generally it is about from 0.5% to 15% by mass in terms of solid contents.

The ink composition of the present invention may include a sensitizer as required with an object of elongating the wavelength of the photosensitive wavelength. The sensitizer may be anything as long as it sensitizes the photo-acid generator in an electron-transfer mechanism or an energy-transfer mechanism.

[Anti-Oxidant]

An anti-oxidant may be added in order to improve the stability of the ink composition. Examples of the anti-oxidant include ones described in European Patent Publication Nos. 223739, 309401, 309402, 310551, 310552, and 459-416, German Patent Publication No. 3435443, JP-A Nos. 54-48535, 62-262047, 63-113536, and 63-163351, JP-A No. 02-262654, JP-A No. 02-71262, JP-A No. 03-121449, JP-A No. 05-61166, JP-A No. 05-119449, U.S. Pat. No. 4,814,262, and U.S. Pat. No. 4,980,275.

The dosage is suitably selected according to the object, however generally this is about from 0.1% to 8% by mass in terms of solid contents.

[Discoloration Inhibitor]

Various organic compounds and metal complexes can be used as a discoloration inhibitor in the ink composition of the present invention. Examples of the organic discoloration inhibitor include hydroquinones, alkoxyphenols, dialkoxyphenols, phenols, anilines, amines, indans, chromans, alkoxyanilines, and heterocycles. Examples of the metal complexes include a nickel complex and a zinc complex. Specific examples thereof include the compounds described in the cited patents described in the I and J paragraphs of the VII section of Research Disclosure No. 17643, and Research Disclosure No. 15162, the left column of page 650 of Research Disclosure No. 18716, page 527 of Research Disclosure No. 36544, and page 872 of Research Disclosure No. 307105, and Research Disclosure No. 15162, and compounds included in Formulae of the representative compounds and examples of the compounds described in JP-A No. 62-215272, pages 127 to 137.

The addition amount is suitably selected according to the object, however generally it is about from 0.1% to 8% by mass in terms of solid contents.

[Electrically Conductive Salts]

With an object of controlling the ejection property, electrically conductive salts such as potassium thiocyanate, lithium nitrate, ammonium thiocyanate, and dimethylamine hydrochloride may be added into the ink composition of the present invention.

[Solvent]

In order to improve the adhesions with the recording medium, it is also effective to add a trace amount of organic solvent into the ink composition of the present invention.

Examples of the solvent include: ketone solvents such as acetone, methyl ethyl ketone, diethyl ketone; alcohol solvents such as methanol, ethanol, 2-propanol, 1-propanol, 1-butanol, and tert-butanol; chlorine-based solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethylether.

In this case, the effective addition is within a range not causing problems such as solvent resistance and VOC. The amount thereof is preferably within a range of from 0.1% to 5% by mass, and more preferably from 0.1% to 3% by mass with respect to the amount of the total ink composition.

[Polymer Compound]

In order to adjust the film property, various polymer compounds other than the specific polymer described above may be added into the ink composition of the present invention. Examples of the polymer compounds include an acrylic polymer, a polyvinyl butyral resin, a polyurethane resin, a polyamide resin, a polyester resin, an epoxy resin, a phenol resin, a polycarbonate resin, a polyvinylformal resin, a shellac, a vinyl resin, an acrylic resin, a rubber resin, waxes, and other natural resins. Two of them may be used in combination. Among these, preferred is a vinyl copolymer obtained by copolymerization of acrylic monomers. Furthermore, copolymers including "carboxy group-comprising monomers", "alkyl methacrylate", or "alkyl acrylate" as a structural unit can be also preferably used as a copolymer composition of the polymer binding material.

[Surfactant]

A surfactant may be added to the ink composition of the present invention.

Examples of the surfactant include those described in JP-A Nos. 62-173463 and 62-183457. Examples thereof include: anionic surfactants such as dialkyl sulfosuccinate, alkyl naphthalenesulfonate, and fatty acid salt; nonionic surfactants such as polyoxyethylene alkyl ether, polyoxyethylene alkyl aryl ether, acetylenic glycol, and polyoxyethylene/polyoxypropyrene block copolymer; and cationic surfactants such as alkylamine salt, and quaternary ammonium salt. A fluorocarbon compound may be used instead of the surfactant. The fluorocarbon compound is preferably hydrophobic. Examples of the fluorocarbon compound include fluorine-comprising surfactants, oily fluorine-comprising compounds (such as fluorine oil), and fluorine-comprising solid resins (such as ethylene tetrafluoride resin). The fluorocarbon compounds are described in JP-B No. 57-9053 (column 8 to 17), and JP-A No. 62-135826.

In addition, leveling addition agents, matte agents, waxes for adjusting the film property, and a tackifier which does not inhibit the polymerization, to improve the adhesion with the recording medium such as polyolefine or PET may be added as necessary.

Specific example of the tackifier include cohesive polymers of high molecular weight described in JP-A No. 2001-49200, pages 5 and 6 (for example, a copolymer having an ester of (meth)acrylate and alcohol including an alkyl group having 1 to 20 carbon atoms, an ester of (meth)acrylate and alicyclic alcohol having 3 to 14 carbon atoms, and an ester of (meth)acrylate and aromatic alcohol having 6 to 14 carbon atoms), and tackifying resins of low molecular weight having a polymerizable unsaturated bond.

Considering the ejection property, the viscosity of the ink composition of the present invention is preferably from 7 mPa·s to 30 mPa·s, and more preferably from 7 mPa·s to 20 mPa·s at the temperature at the time of ejection. It is preferred to suitably adjust and determine the composition ratio so that the viscosity is within the above range. The ink viscosity is from 35 mPa·s to 500 mPa·s, and preferably from 35 mPa·s to 200 mPa·s at room temperature (from 25° C. to 30° C.). By setting a high viscosity at room temperature, even if a porous recording medium is used, it becomes possible to prevent ink permeation into the recording medium, to decrease the uncured monomer, and to reduce odor. Furthermore, dot bleeding at the time of ink droplet spotting can be suppressed, resulting in improvement in the image quality. When the ink viscosity at 25° C. to 30° C. is less than 35 mPa·s, the effect of preventing bleeding is insufficient. Conversely when it is more than 500 mPa·s, problems occur in the ink liquid delivery.

As the preferable combination of the constituent components of the ink composition according to the present invention, a combination of preferable examples of each constituent component is still more preferable.

The surface tension of the ink composition of the present invention is preferably from 20 mN/m to 30 mN/m, and more preferably from 23 mN/m to 28 mN/m. In the case where recording is performed onto various recording media such as polyolefine, PET, a coated paper, and an uncoated paper, the surface tension is preferably 20 mN/m or more from the viewpoints of bleeding and permeation, and preferably 30 mN/m or less from the viewpoint of wettability.

The ink composition of the present invention adjusted in this manner is used as an inkjet recording ink. When it is used as an inkjet recording ink, the ink composition is ejected onto a recording medium by an inkjet printer, and then the ejected ink composition is cured by irradiating radiation to perform recording.

Since the image area is cured by irradiation of radiation rays such as ultraviolet rays, and the image area has excellent strength, the printed material obtained by the ink can be used for various usages such as formation of an ink receiving layer (image area) of a planographic printing plate, in addition to image formation by the ink.

<Inkjet Recording Method>

Next is a description of an inkjet recording method and an inkjet recording apparatus, suitably employable for the present invention.

The inkjet recording method of the invention comprises ejecting the ink composition of the present invention onto a recording medium by an inkjet recording apparatus, and curing the ejected ink composition by irradiating actinic radiation ray.

In the inkjet recording method, it is preferable that the ink composition is heated to 40° C. to 80° C. and the ink composition viscosity is decreased to 7 mPa·s to 30 mPa·s, then ejected. By using this method, a high ejection stability can be achieved. The radiation curable ink composition generally has a greater viscosity than that of an aqueous ink. Therefore the viscosity greatly fluctuates due to the temperature fluctuation at the time of ink ejection. The fluctuation of the ink viscosity has a great direct affect on the droplet size and the droplet ejecting speed, causing deterioration in the image quality. Therefore, it is required to keep the ink composition temperature at the time of ink ejection as constant as possible. The control range of the ink composition temperature is suitably ±5° C., preferably ±2° C., and more preferably ±1° C. with respect to the set temperature.

One characteristic of the inkjet recording apparatus is that it comprises a stabilizing device for the ink composition temperature. Regarding the portion to be kept at a constant temperature, all piping systems and members from the ink tank (or intermediate tank, if any) to the nozzle ejecting surface become the subject.

The method of controlling the temperature is not specifically limited, however for example, it is preferable to provide a plurality of temperature sensors in the respective piping sites so as to control the heating according to the ink composition flow rate and the environmental temperature. Moreover, the head unit to be heated is preferably thermally blocked or insulated so that the main body of the apparatus is not affected by the outside temperature. In order to shorten the printer start-up time required for heating, or to reduce the heat energy loss, it is preferable to thermally insulate from the other parts, and decrease the heat capacity of the overall heating unit.

Next is a description of the irradiation conditions of radiation. The basic irradiation method is disclosed in JP-A No. 60-132767. Specifically, light sources are provided on the both sides of a head unit, and the head and the light sources are scanned by a shuttle method. Irradiation is performed after a fixed time after the ink is spotted. Furthermore, the curing is completed by another light source without driving. In WO No. 99/54415, a method of using an optical fiber, and a method wherein a collimated light source is faced to a mirror surface provided on the side face of a head unit to irradiate UV ray to a recording unit are disclosed as an irradiation method. In the present invention, these irradiation methods can be used.

Moreover, in the present invention, it is desirable to heat the ink composition to a fixed temperature, and to set the time from spotting to irradiation, to 0.01 seconds to 0.5 seconds, preferably 0.01 seconds to 0.3 seconds, and more preferably 0.01 seconds to 0.15 seconds. Such a control of the time from spotting to irradiation within a very short time enables preventing bleeding of the spotted ink before being cured. Moreover, since a porous recording medium can also be exposed to light before the ink composition is permeated to the deep part where the light source cannot reach, the residual unreacted monomer can be reduced, resulting in odor reduction. By using the abovementioned inkjet recording method and the ink composition of the present invention together, a great synergistic effect is produced. In particular, if an ink composition having an ink viscosity of from 35 MP·s to 500 MP·s at 25 C.° is used, a great effect can be obtained. By employing such a recording method, with respect to various recording media having various surface wettability, the dot diameter of the spotted ink can be kept constant and the image quality is improved. In order to obtain a color image, it is preferable to superpose inks in the order from less bright color to brighter color. When inks of less bright color are superposed, it is hard for radiation to reach to the ink at the bottom, readily causing inhibition of curing sensitivity, increase in residual monomer, generation of odor, and deterioration of adhesion. Moreover, in the irradiation, all colors can be ejected and exposed to light all in at once, however each color is preferably exposed to light one by one from the viewpoint of accelerating the curing.

The inkjet recording apparatus used in the present invention is not specifically limited, and a commercially available inkjet recording apparatus can be used. That is, in the present invention, recording can be performed on a recording medium using a commercially available inkjet recording apparatus.

(Recording Medium)

The recording medium to which the ink composition of the present invention can be applied is not specifically limited, and papers such as a normal uncoated paper and a coated paper, various non-absorptive resin materials used for so-called soft packaging, or a resin film thereof formed into a film shape may be used. Examples of various plastic films include a PET film, an OPS film, an OPP film, an ONy film, a PVC film, a PE film, and a TAC film. Other plastics that can be used as a material of the recording medium include a polycarbonate, an acrylic resin, ABS, polyacetal, PVA, and rubbers. Moreover, metals or glasses may be used as a recording medium.

Since the ink composition of the present invention has less heat shrinkage at the time of curing and superior adhesion with a substrate (recording medium), there is an advantage of being capable of forming a very fine image even on a film that is easily curled or deformed by ink shrinkage on curing or heating during the curing reaction, such as a PET film, an OPS film, an OPP film, an ONy film, and a PVC film that can be shrunk by heat.

<Printed Article>

The printed article of the present invention has an image that is formed from the ink composition of the present invention using the foregoing inkjet recording method (inkjet recording method of the present invention).

Therefore the printed article is excellent in rubfastness, having an image excellent in rubfastness, with surface tackiness adequately suppressed.

EXAMPLES

Hereinafter is a specific description of the present invention with reference to the following examples. However, the present invention is not limited to the forms of these examples.

<Preparation of Ink Compositions>

Example 1

Synthesis of Specific Polymer a-1

In an autoclave with an internal volume of 1 L, the following components are charged and reacted at 75° C. for 12 hours while stirred in nitrogen gas atmosphere to obtain a solution of a polymer 1.

Methyl ethyl ketone (MEK), serving as a solvent, 350 g;

2-(2-Bromoisobutyryloxy)ethyl methacrylate (BBEM, manufactured by MANAC Inc.), serving as a polymerizable compound 1, 165 g;

Mono-terminal methacrylate denatured dimethyl silicone (TM-0701, manufactured by CHISSO CORP.), serving as a siloxane compound, 100 g;

Methyl methacrylate, serving as a polymerizable compound 2, 35 g; and

Dimethyl 2,2'-azobis(2-methylpropionate)

(V-601, manufactured by Wako Pure Chemical Industries, Ltd., (0.25 mol %)), serving as an initiator, 0.68 g.

Further, to the reaction mixture that includes the polymer 1 thus prepared, 350 g MEK and 300 g of 1,8-diazabicyclo [5.4.0]undec-7-ene (DBU) are added. After the resultant solution is stirred at room temperature for 12 hours, it is neutralized with trifluoromethane sulfonic acid, purified by reprecipitation with water, and vacuum-dried so as to obtain a specific polymer a-1 (231 g). The weight average molecular weight of the specific polymer a-1 is 77,000.

Note that, the structure of the specific polymer a-1 corresponds to a-1 among a-1 to a-20 that are listed as specific examples of the specific polymer (a) in the present invention.

(Preparation Of Ink Composition Of Example 1)

A mixture of the following components is filtered with a 2 μm aperture filter to obtain an ink composition of Example 1.

The viscosity of the ink composition at an ejection temperature (45° C.) is approximately 10 mPa·s.

Phenoxyethyl acrylate, 36 parts by mass;

ACTILANE 421

(manufactured by Akcros Corp., acrylate monomer), 16.0 parts by mass;

n-Vinylcaprolactam, 18 parts by mass;

SOLSPERSE 32000 (manufactured by Noveon Corp., dispersant), 0.4 parts by mass;

CINQUASIA MAZENTA RT-355D (manufactured by Ciba Specialty Chemicals Corp., pigment), 3.6 parts by mass;

GENORAD 16 (manufactured by Rahn Corp., stabilizer), 0.05 parts by mass;

RAPI-CURE DVE-3 (manufactured by ISP Europe Corp., vinyl ether), 8.0 parts by mass;

LUCIRIN TPO (manufactured by BASF Corp., photoinitiator), 8.5 parts by mass;

Benzophenone (photoinitiator), 4.0 parts by mass;

IRGACURE 184 (manufactured by Ciba Specialty Chemicals Corp., photoinitiator), 4.0 parts by mass;

BYK 307 (manufactured by BYK Chemie Corp., defoaming agent), 0.05 parts by mass; and Specific polymer a-1 (compound obtained in the foregoing synthesis example), 0.9 parts by mass.

Examples 2 to 6 and Comparative Examples 1 to 4

(Synthesis of Specific Polymers a-2 to a-6 and Comparative Compounds 1 to 3)

Specific polymers a-2 to a-6 and comparative compounds 1 to 3 are synthesized substantially similarly to Example 1, except that the polymer composition in the synthesis process of the specific polymer a-1 is replaced by the compositions shown in the following Table 1.

The structures of the specific polymers a-2 to a-6 correspond to a-2 to a-6 among a-1 to a-20 that are listed as illustrative examples of the specific polymer (a), and the structures of the comparative compounds 1 to 3 are as follows.

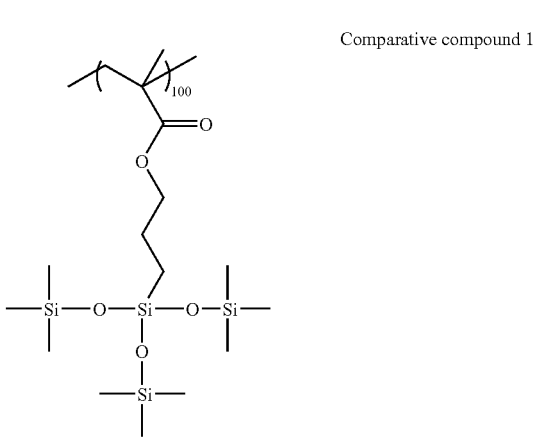

Comparative compound 1

-continued

Comparative compound 2

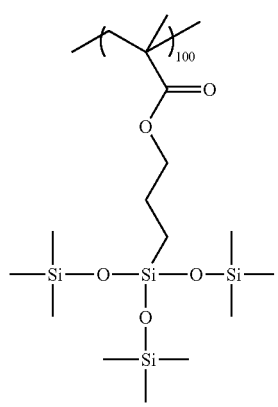

Comparative compound 3

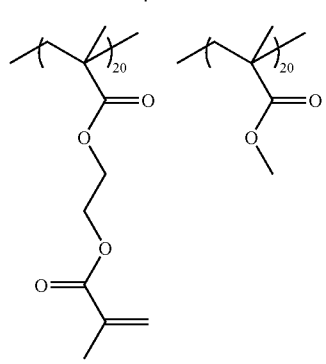

IBXMA: isobornyl methacrylate (manufactured by KYOEISHA CHEMICAL Co., LTD.) (homopolymer thereof has a glass transition temperature of 91° C.); and FA-513M: dicyclopentanyl methacrylate (manufactured by Hitachi Chemical Co., Ltd.) (homopolymer thereof has a glass transition temperature of 175° C.).

(Preparation of ink compositions of Examples 2 to 6 and Comparative Examples 1 to 4)

Ink compositions of Examples 2 to 6 and Comparative Examples 1 to 4 are prepared substantially similarly to Example 1, except that the polymer (the specific polymer a-1 in Example 1) is replaced by the polymers shown in the following Table 2 in the preparation process of the ink composition of Example 1, or no polymer is used.

Example 7

Preparation of Cationic Polymerizable Ink
(Synthesis of Specific Polymer a-13)

In an autoclave with an internal volume of 1 L, the following components are charged and reacted at 75° C. for 12 hours while stirred in nitrogen gas atmosphere to obtain a solution of a polymer.

Methyl ethyl ketone (MEK), serving as a solvent, 310 g;

Glycidyl methacrylate (BLENMER G, manufactured by Nippon Oil and Fats Co., Ltd.), serving as a polymerizable compound, 67 g;

Mono-terminal methacrylate denatured dimethyl silicone (TM-0701, manufactured by CHISSO CORP.), serving as a siloxane compound, 100 g;

Methyl methacrylate, serving as a polymerizable compound, 8 g; and

TABLE 1

| | | Polymer composition (mol %) | | | | | | Molecular weight |
|---|---|---|---|---|---|---|---|---|
| | Polymer | TM-0701 | FM-0711 | BBEM | MMA | IBXMA | FA-513 | |
| Example 1 | Specific polymer compound a-1 | 20 | — | 50 | 30 | — | — | 77,000 |
| Example 2 | Specific polymer compound a-2 | 40 | — | 60 | — | — | — | 110,000 |
| Example 3 | Specific polymer compound a-3 | 30 | — | 30 | — | 40 | — | 80,000 |
| Example 4 | Specific polymer compound a-4 | — | 40 | 60 | — | — | — | 65,000 |
| Example 5 | Specific polymer compound a-5 | — | 20 | 60 | 20 | — | — | 48,000 |
| Example 6 | Specific polymer compound a-6 | — | 20 | 60 | — | — | 20 | 52,000 |
| Comparative Example 2 | Comparative compound 1 | 100 | — | — | — | — | — | 62,000 |
| Comparative Example 3 | Comparative compound 2 | 60 | — | — | 40 | — | — | 60,000 |
| Comparative Example 4 | Comparative compound 3 | — | — | 60 | 40 | — | — | 55,000 |

The details of the components shown in Table 1 are as follows.

TM-0701: mono-terminal methacrylate denatured dimethyl silicone (manufactured by CHISSO CORP.);

FM-0711: mono-terminal methacrylate denatured dimethyl silicone (manufactured by CHISSO CORP.);

BBEM: 2-(2-bromoisobutyloyloxy)ethyl methacrylate (manufactured by MANAC Inc.);

MMA: methyl methacrylate (homo-polymer thereof has a glass transition temperature of 105° C.);

Dimethyl 2,2'-azobis(2-methylpropionate) (V-601, manufactured by Wako Pure Chemical Industries, Ltd., (0.25 mol %)), serving as an initiator, 0.45 g.

Further, the solution is purified by reprecipitation with water and vacuum-dried to obtain a specific polymer a-13 having the foregoing structure (158 g). The weight average molecular weight of the specific polymer a-13 is 68,000.

Note that, the structure of the specific polymer a-13 corresponds to a-13 among a-1 to a-20 that are listed as illustrative examples of the specific polymer (a) in the present invention.

(Preparation of Ink Composition of Example 7)

A mixture of the following components is filtered with a 2 μm aperture filter to obtain an ink composition of Example 7. The viscosity of the ink composition at an ejection temperature (45° C.) is within 10 mPa·s.

Cationic Polymerizable Compound:
CELLOXIDE 2021 (epoxy compound, manufactured by Daicel UCB Co., Ltd.), 35 parts by mass;
OXT-221 (oxetane compound, manufactured by TOAGOSEI CO., LTD.), 55 parts by mass;
Photo-Induced Acid Generating Agent:
UVI-6990, manufactured by Union Carbide Corp., 10 parts by mass;
Colorant: the following yellow pigment dispersion 1, 5 parts by mass; and
Specific polymer a-13, 1.1 parts by mass.

(Yellow Pigment Dispersion 1)

The following components are mixed to prepare a yellow pigment dispersion 1.
C.I. Pigment Yellow 12, 10 parts by mass;
Polymer dispersant (SOLSPERSE Series, manufactured by Zeneca Corp.), 5 parts by mass; and
Triethylene glycol divinyl ether, 85 parts by mass.

(Preparation of Ink Compositions of Examples 8 to 12 and Comparative Examples 5 to 8)

Ink compositions of Examples 8 to 12 and Comparative Examples 5 to 8 are prepared substantially similarly to Example 7, except that the polymer (the specific polymer a-13 in Example 7) is replaced by the polymers shown in the following Table 2 in the preparation process of the ink composition of Example 7, or no polymer is used.

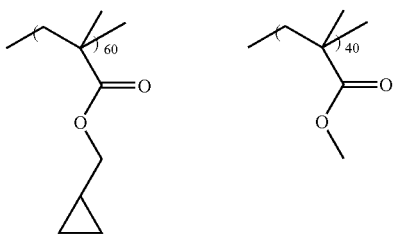

Comparative compound 4

<Inkjet Image Recording>

Next, recording on a recording medium is performed using a commercially available inkjet recording apparatus having a piezo type inkjet nozzle. The ink supply system comprises an initial tank, a supply piping, an ink supply tank immediately in front of an inkjet head, a filter, and a piezo type inkjet head. The heat insulation and heating are performed in the part from the ink supply tank to the inkjet head. The temperature sensors are respectively provided in the vicinity of the ink supply tank and the nozzle of the inkjet head to perform temperature control so that the nozzle part was always at 70° C.±2° C. The piezo type inkjet head is driven so that multisize dots of 8 pl to 30 pl could be ejected with a resolution of 720×720 dpi. After the spotting, the exposure system, the main scanning speed, and the ejection frequency are adjusted so that UV rays are concentrated to an exposure illuminance of 100 mW/cm², and the irradiation is started after 0.1 second since the ink has been spotted onto the recording medium. Moreover, the expo-

TABLE 2

| | | Polymer composition (mol %) | | | | | | | | | |
| | Polymer | TM-0701 | FM-0711 | GMA | OXE-30 | CYCLO-MER M100 | MEDOL 10 | MEDOL 30 | MMA | IBXMA | FA-513 | Molecular weight |
|---|---|---|---|---|---|---|---|---|---|---|---|---|
| Example 7 | a-13 | 30 | | 60 | | | | | 10 | | | 68,000 |
| Example 8 | a-14 | 30 | | | 30 | | | | | 40 | | 59,000 |
| Example 9 | a-15 | 40 | | | | 60 | | | | | | 70,000 |
| Example 10 | a-16 | | 60 | | | | 20 | | 20 | | | 62,000 |
| Example 11 | a-17 | | 60 | | | | | 20 | | | 20 | 58,000 |
| Example 12 | a-18 | | 20 | 80 | | | | | | | | 66,000 |
| Comparative Example 8 | Comparative compound 4 | | | 60 | | | | | 40 | | | 62,000 |

In Table 2, a-13 to a-18 in the column of "Polymer" represent the specific polymers a-13 to a-18.

The details of the components of the polymer composition in Table 2 are as follows.

GMA: glycidyl methacrylate (BLENMER G, manufactured by Nippon Oil and Fats Co., Ltd.);
OXE-30: methyl-3-oxetanylmethyl acrylate (manufactured by OSAKA ORGANIC CHEMICAL INDUSTRY LTD.);
CYCLOMER M100, manufactured by DAICEL CHEMICAL INDUSTRIES, LTD.;
MEDOL 10, manufactured by OSAKA ORGANIC CHEMICAL INDUSTRY LTD.); and
MEDOL 30, manufactured by OSAKA ORGANIC CHEMICAL INDUSTRY LTD.).

Note that, in Table 2, TM-0701, FM-0711, MMA, IBXMA, and FA-513M are the same as in Table 1.

In Table 2, the structures of the specific polymers a-14 to a-18 correspond to a-14 to a-18 among a-1 to a-20 that are listed as specific examples of the specific polymer (a), and the structure of the comparative compound 4 is as follows.

sure time is variable to irradiate the exposure energy. dpi in the present invention denotes the number of dots per 2.54 cm.

Each ink composition prepared above is ejected at an ambient temperature of 25° C. As the UV-LED, NCCU033 manufactured by Nichia Corp. is used, and UV light ray is irradiated on each ink. The foregoing LED outputs UV light rays having a wavelength of 365 nm from a single chip, and light of about 100 mW is emitted from the chip by passing about 500 mA current therethrough. Plural of this LED are arrayed with a spacing of 7 mm, so that a power of 0.3 W/cm² is obtained at the surface of a recording medium to be recorded (hereinafter, also referred to as media). The time from the ink is dropped till it is exposed to light and the time of light exposure are variable depending on the transporting speed of the media and the distances to the head and LED along the direction of transporting. In the present example, the ink is exposed to light at about 0.5 second later after the ink is landed.

In accordance with the setting of the distance to the media and the transporting speed, the light exposure energy on the media may be adjusted in a range of from 0.01 J/cm² to 15 J/cm². The irradiation continues until the image face loses tackiness after UV ray is irradiated. Note that, as the recording medium to be recorded, a soft vinylchloride sheet is used.

In this condition, the transfer sensitivity, ejection stability and percent of stretching of the inks, and the blocking sensitivity and rubfastness of resultant images formed by using the inks are evaluated. Results are shown in Table 3. In Table 3, the measurement and evaluation method used for each evaluation is as follows.

(Transfer Sensitivity Measurement)

The amount of exposure energy (mJ/cm²) at which tackiness is lost on the image face after UV ray irradiation is defined as sensitivity. The smaller value of the amount is, the higher the sensitivity is.

The acceptable range of the transfer sensitivity is 750 mJ/cm² or less for an ink of radical system and preferably 350 mJ/cm² or less. For an ink of cationic system, it is 50 mJ/cm² or less and preferably 30 mJ/cm² or less.

(Blocking Sensitivity Evaluation)

On an image formed after UV ray irradiation, 500 sheets of PET (size: the same length and breadth as the soft vinylchloride sheet on which the image is formed, weight: 2 g/sheet) are loaded in piles and left for one day. Whether image transfer to the PET occurs or not is evaluated by visual observation. The case where no image transfer occurs is judged as "A", while the case where image transfer occurs is judged as "C".

The acceptable range of the blocking sensitivity is 12,000 mJ/cm² or less for the ink of radical system and preferably 6,000 mJ/cm² or less. For the ink of cation system, it is 800 mJ/cm² or less and preferably 600 mJ/cm² or less.

(Rubfastness Evaluation)

The soft vinylchloride sheet is rubbed with a rubber eraser (K-50 PLASTIC ERASER KEEP, manufactured by HOSHIYA), and transfer to the rubber easer is evaluated. The evaluation criteria are as follows.

Evaluation Criteria:
A: no transfer is found, and
C: transfer is found.

(Evaluation for Percent of Stretching)

A cured film is prepared substantially similar to a case of tack-free sensitivity, except that FASSON PE (polyethylene film, manufactured by Fasson Corp., 100 μm thick) is used as a support at an integrated exposure light quantity of 12,000 mJ/cm² and an illuminance of 2140 mW/cm². The resultant cured film is cut into a specimen with a size of 5 cm length and 2.5 cm width. The specimen is stretched with a tensile tester (manufactured by Shimadzu Corp.) at a speed of 30 cm/min, and the percent of stretching at break is measured. The state in which the specimen is stretched by two times of the original length thereof is defined as 100% of stretching.

The acceptable range of the percent of stretching is 200% or more for the ink of radical system and preferably 300% or more. The acceptable range of the percent of stretching is 120% or more for the ink of cationic system and preferably 150% or more.

(Ejection Stability Evaluation)

In order to evaluate the ejection stability of the ink at a head nozzle, the number of nozzle losses is evaluated in the course of a continuous ejection test over 60 minutes using a commercially available inkjet recording apparatus having inkjet nozzles of piezo type under the following conditions.

In the experiment, the number of nozzle losses (the number of times the nozzle is clogged) is counted when the ink composition is ejected on a PET substrate and then exposed to light (light exposure amount: 1,000 mW/cm²). The case where the number of the nozzle losses is 0 or more and less than 5 is evaluated as "A", the case where the number of the nozzle losses is 5 or more and less than 10 is evaluated as "B", and the case where the number is 10 or more is evaluated as "C".

—Conditions—:
Number of channels: 318/head,
Drive frequency: 4.8 kHz/dot,
Ink drops: 7 drops, 42 pl, and
Temperature: 45° C.

TABLE 3

| | Polymer | Transfer sensitivity | Blocking sensitivity | Rubfastness | Percent of stretching | Ejection stability |
|---|---|---|---|---|---|---|
| Example 1 | Specific polymer compound a-1 | 350 | 6,000 | A | 250 | A |
| Example 2 | Specific polymer compound a-2 | 350 | 6,000 | A | 250 | A |
| Example 3 | Specific polymer compound a-3 | 350 | 6,000 | A | 250 | A |
| Example 4 | Specific polymer compound a-4 | 350 | 6,000 | A | 250 | A |
| Example 5 | Specific polymer compound a-5 | 350 | 6,000 | A | 250 | A |
| Example 6 | Specific polymer compound a-6 | 350 | 6,000 | A | 250 | A |
| Comparative Example 1 | None | 2,500 | 30,000 or more | C | 250 | A |
| Comparative Example 2 | Comparative compound 1 | 750 | 18,000 | B | 250 | C |
| Comparative Example 3 | Comparative compound 2 | 350 | 18,000 | B | 250 | B |
| Comparative Example 4 | Comparative compound 3 | 1,500 | 12,000 | B | 130 | A |
| Example 7 | Specific polymer compound a-13 | 30 | 600 | A | 150 | A |
| Example 8 | Specific polymer compound a-14 | 30 | 600 | A | 150 | A |
| Example 9 | Specific polymer compound a-15 | 30 | 600 | A | 150 | A |
| Example 10 | Specific polymer compound a-16 | 30 | 600 | A | 150 | A |

TABLE 3-continued

| | Polymer | Transfer sensitivity | Blocking sensitivity | Rubfastness | Percent of stretching | Ejection stability |
|---|---|---|---|---|---|---|
| Example 11 | Specific polymer compound a-17 | 30 | 600 | A | 150 | A |
| Example 12 | Specific polymer compound a-18 | 30 | 600 | A | 150 | A |
| Comparative Example 5 | None | 80 | 600 | B | 150 | A |
| Comparative Example 6 | Comparative compound 1 | 50 | 600 | B | 150 | C |
| Comparative Example 7 | Comparative compound 2 | 30 | 1,500 | B | 150 | B |
| Comparative Example 8 | Comparative compound 4 | 50 | 1,000 | B | 100 | A |

As is shown clearly from Table 3, in any case where the polymerizable compounds used in Examples are radical polymerizable or cationic polymerizable, the ink compositions of the present invention are excellent in the ejection stability and transfer sensitivity as compared to the ink compositions of Comparative Examples. The images formed by using the ink compositions of the present invention are excellent in the blocking resistance and rubfastness. It is shown that image formation with excellent rubfastness and excellent stretching property is attainable simultaneously with ink ejection stability.

In contrast the ink compositions of Comparative Examples are shown to be insufficient in a term of at least one of the transfer sensitivity and the blocking sensitivity, and insufficient in rubfastness.

According to the present invention, an ink composition having excellent ink ejection stability and stretching property, curable with a high sensitivity by irradiation of radiation rays, and capable of forming an image excellent in rubfastness and blocking resistance, an inkjet recording method using the ink, and a printed article are provided.

Namely, the present invention may provide the following items <1> to <11>.

<1> An ink composition comprising: (a) a polymer having a siloxane structure and a polymerizable group on a side chain thereof; (b) a polymerizable compound; and (c) a photopolymerization initiator.

<2> The ink composition according to the item <1>, wherein a siloxane compound capable of forming the siloxane structure of the polymer (a) on a side chain thereof is a compound represented by the following Formula (A):

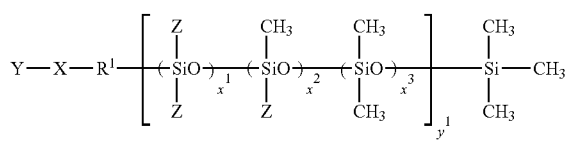

Formula (A)

wherein in Formula (A), $R^1$ is a straight chain or branched alkylene group having 2 to 6 carbon atoms or a divalent connecting group represented by the following Formula (B); $x^1$, $x^2$ and $x^3$ are integers having a relationship such that the sum of $x^1$, $x^2$ and $x^3$, ($x^1+x^2+x^3$), is from 1 to 100; $y^1$ is an integer of from 1 to 10; X is a single bond or a divalent group represented by the following Formula (C); Y represents a monovalent group represented by any of Formulae (D) to (F); and Z represents a monovalent group represented by the following Formula (G);

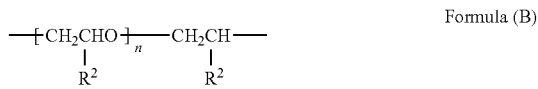

Formula (B)

wherein in Formula (B), $R^2$ represents a hydrogen atom or a methyl group, and n represents an integer of from 1 to 50;

$$—Z^1—CO—NH—R^3—NH—CO—$$ Formula (C)

wherein in Formula (C), $Z^1$ represents an oxygen atom, a sulfur atom, or $NR^4$; $R^4$ represents a hydrogen atom or an alkyl group having 1 to 4 carbon atoms; $Z^1$ is bonded to $R^1$ in Formula (A); and $R^3$ represents a divalent aliphatic or alicyclic group having 6 to 10 carbon atoms;

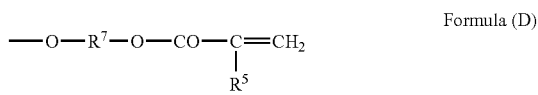

Formula (D)

Formula (E)

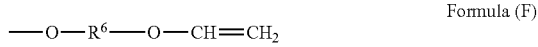

Formula (F)

wherein in Formulae (D) to (F), $R^5$ represents a hydrogen atom or a straight chain or branched alkyl group having 1 to 6 carbon atoms, $R^6$ represents a straight chain or branched alkylene group having 2 to 10 carbon atoms, and $R^7$ represents a straight chain or branched alkylene group having 1 to 6 carbon atoms;

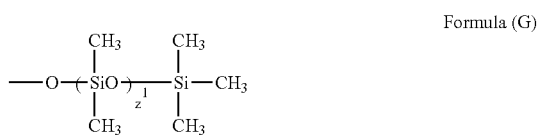

Formula (G)

wherein in Formula (G), $z^1$ is an integer of from 3 to 100.

<3> The ink composition according to the item <1> or <2>, wherein the polymerizable group of the polymer (a) on a side chain thereof is a radical polymerizable group.

<4> The ink composition according to item <1> or <2>, wherein the polymerizable group of the polymer (a) on a side chain thereof is a cationic polymerizable group.

<5> The ink composition according to any one of items <1> to <4>, wherein the polymer (a) further comprises a monomer capable of forming a homopolymer having a glass transition temperature of 50° C. or higher as a copolymerized component.

<6> The ink composition according to any one of items <1> to <3> and item <5>, wherein the polymerizable compound (b) is a radical polymerizable compound.

<7> The ink composition according to any one of item <1>, item <2>, item <4> and item <5>, wherein the polymerizable compound (b) is a cationic polymerizable compound.

<8> The ink composition according to any one of items <1> to <7>, wherein the content of the polymer (a) is, with respect to the total solid content of the ink composition, from 0.1% to 10% by mass.

<9> A use for inkjet recording of the ink composition according to any one of items <1> to <8>.

<10> An inkjet recording method comprising: ejecting on a recording medium the ink composition of any one of items <1> to <9> using an inkjet recording apparatus; and curing the ink composition by irradiation of an actinic radiation ray to the ejected ink composition.

<11> A printed article recorded by the inkjet recording method according to item <10>.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An ink composition comprising: (a) a polymer having a siloxane structure and a polymerizable group on a side chain thereof; (b) a polymerizable compound; (c) a photopolymerization initiator; and (d) a monofunctional monomer, the siloxane structure being obtained by polymerizing a compound represented by the following Formula (A):

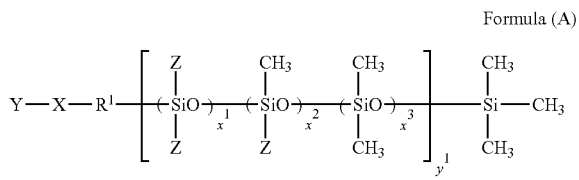

Formula (A)

wherein in Formula (A), $R^1$ is a straight chain or branched alkylene group having 2 to 6 carbon atoms or a divalent connecting group represented by the following Formula (B); $x^1$, $x^2$ and $x^3$ are integers having a relationship such that the sum of $x^1$, $x^2$ and $x^3$, ($x^1+x^2+x^3$), is from 1 to 100; $y^1$ is an integer of from 1 to 10; X is a single bond or a divalent group represented by the following Formula (C); Y represents a monovalent group represented by any of Formulae (D) to (F); and Z represents a monovalent group represented by the following Formula (G);

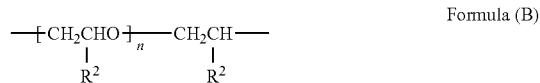

Formula (B)

wherein in Formula (B), $R^2$ represents a hydrogen atom or a methyl group, and n represents an integer of from 1 to 50;

$$-Z^1-CO-NH-R^3-NH-CO-$$ Formula (C)

wherein in Formula (C), $Z^1$ represents an oxygen atom, a sulfur atom, or $NR^4$; $R^4$ represents a hydrogen atom or an alkyl group having 1 to 4 carbon atoms; $Z^1$ is bonded to $R^1$ in Formula (A); and $R^3$ represents a divalent aliphatic or alicyclic group having 6 to 10 carbon atoms;

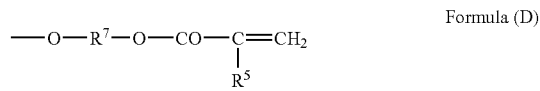

Formula (D)

Formula (E)

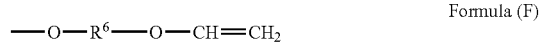

Formula (F)

wherein in Formulae (D) to (F), $R^5$ represents a hydrogen atom or a straight chain or branched alkyl group having 1 to 6 carbon atoms, $R^6$ represents a straight chain or branched alkylene group having 2 to 10 carbon atoms, and $R^7$ represents a straight chain or branched alkylene group having 1 to 6 carbon atoms;

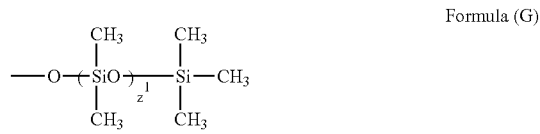

Formula (G)

wherein in Formula (G), $z^1$ is an integer of from 3 to 100, and wherein the content of the polymer (a) is, with respect to the total solid content of the ink composition, from 0.1% to 10% by mass.

2. The ink composition according to claim 1, wherein the polymerizable group of the polymer (a) on a side chain thereof is a radical polymerizable group.

3. The ink composition according to claim 1, wherein the polymerizable group of the polymer (a) on a side chain thereof is a cationic polymerizable group.

4. The ink composition according to claim 1, wherein the polymer (a) further comprises a monomer capable of forming a homopolymer having a glass transition temperature of 50° C. or higher as a copolymerized component, wherein the monomer capable of forming a homopolymer having a glass transition temperature of 50° C. or higher is at least one selected from the group consisting of isobornyl (meth)acrylate, cyclohexyl (meth)acrylate, tert-butyl (meth)acrylate, methyl methacrylate, ethyl methacrylate, propyl methacrylate, phenyl (meth)acrylate, benzyl (meth)acrylate, phenethyl (meth)acrylate, methyl 2-chloro(meth)acrylate, ethyl α-chloroacrylate, (meth)acrylamide, N-isopropyl acrylamide, and dicylopentanyl (meth)acrylate.

5. The ink composition according to claim 1, wherein the polymerizable compound (b) is a radical polymerizable compound.

6. The ink composition according to claim 1, wherein the polymerizable compound (b) is a cationic polymerizable compound.

7. An inkjet recording composition comprising the ink composition of claim 1.

8. An inkjet recording method comprising:
ejecting on a recordable medium the ink composition of claim 1 using an inkjet recording apparatus; and
curing the ink composition by irradiation of an actinic radiation ray to the ejected ink composition.

9. A printed article recorded by the inkjet recording method according to claim 8.

10. The ink composition according to claim 1, wherein the monofunctional monomer (d) is N-vinyl caprolactam.

* * * * *